US007753079B2

(12) United States Patent
Nelson

(10) Patent No.: US 7,753,079 B2
(45) Date of Patent: Jul. 13, 2010

(54) MAGNETIC COUPLING FOR SPRAYHEADS

(75) Inventor: Alfred Charles Nelson, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 12/059,403

(22) Filed: Mar. 31, 2008

(65) Prior Publication Data

US 2008/0185060 A1 Aug. 7, 2008

Related U.S. Application Data

(63) Continuation-in-part of application No. 11/393,450, filed on Mar. 30, 2006.

(60) Provisional application No. 60/691,389, filed on Jun. 17, 2005.

(51) Int. Cl.
*F16K 21/00* (2006.01)

(52) U.S. Cl. ...................................................... 137/801

(58) Field of Classification Search ................. 137/801; 4/675–678

See application file for complete search history.

(56) References Cited

U.S. PATENT DOCUMENTS 3,181,895 A 5/1965 Cator
4,205,678 A 6/1980 Adair
4,232,695 A 11/1980 Roberge
4,304,256 A 12/1981 Taiani
4,384,703 A 5/1983 Ruyak et al.
4,427,960 A 1/1984 Wuerfel
4,718,131 A 1/1988 Kitamura et al.
5,419,354 A 5/1995 Krynicki
5,645,302 A 7/1997 Horimoto
5,727,769 A * 3/1998 Suzuki .................. 251/129.15
5,771,934 A 6/1998 Warshawsky
6,023,951 A 2/2000 Maurer et al.
6,387,096 B1 5/2002 Hyde, Jr.
6,757,921 B2 7/2004 Esche
6,786,239 B1 9/2004 Welsh
6,845,526 B2 1/2005 Malek et al.
6,877,172 B2 4/2005 Malek et al.
6,910,604 B2 6/2005 Gugliotti et al.
6,938,837 B2 9/2005 Nelson et al.
7,114,510 B2 10/2006 Peters et al.
7,246,757 B2 7/2007 Juo
7,520,105 B2 4/2009 Geller
2003/0188381 A1 10/2003 Bosio
2004/0010848 A1 1/2004 Esche
2004/0135009 A1 7/2004 Malek et al.

(Continued)

FOREIGN PATENT DOCUMENTS

JP 2000-263060 9/2000

(Continued)

OTHER PUBLICATIONS

Grohe Product Catalog pages, "Stainless Steel Pull-Out Spray", 33 755, 2004, 4 pages.

*Primary Examiner*—John Rivell
*Assistant Examiner*—Craig M Schneider
(74) *Attorney, Agent, or Firm*—Baker & Daniels LLP

(57) ABSTRACT

A faucet including a faucet head, a body and a magnetic coupling releasably coupling the faucet head to the faucet body.

52 Claims, 23 Drawing Sheets

U.S. PATENT DOCUMENTS

| | | | |
|---|---|---|---|
| 2004/0144866 | A1 | 7/2004 | Nelson et al. |
| 2004/0177880 | A1 | 9/2004 | Nelson et al. |
| 2004/0254533 | A1 | 12/2004 | Schriver et al. |
| 2006/0130907 | A1 | 6/2006 | Marty et al. |
| 2006/0283511 | A1 | 12/2006 | Nelson |
| 2007/0001018 | A1 | 1/2007 | Schmitt et al. |
| 2007/0170284 | A1 | 7/2007 | Nelson et al. |

FOREIGN PATENT DOCUMENTS

| | | |
|---|---|---|
| JP | 2002-068270 | 3/2002 |
| JP | 2002-223969 | 8/2002 |

* cited by examiner

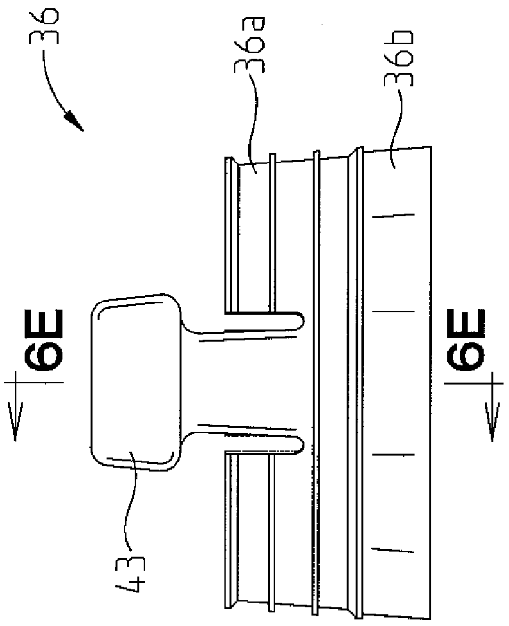
FIG. 6C
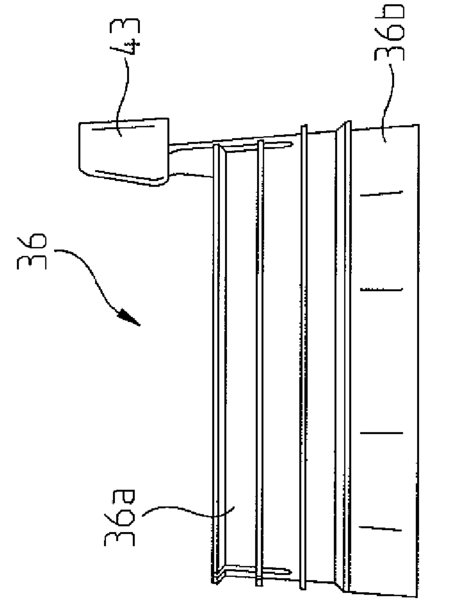
FIG. 6B
FIG. 6D
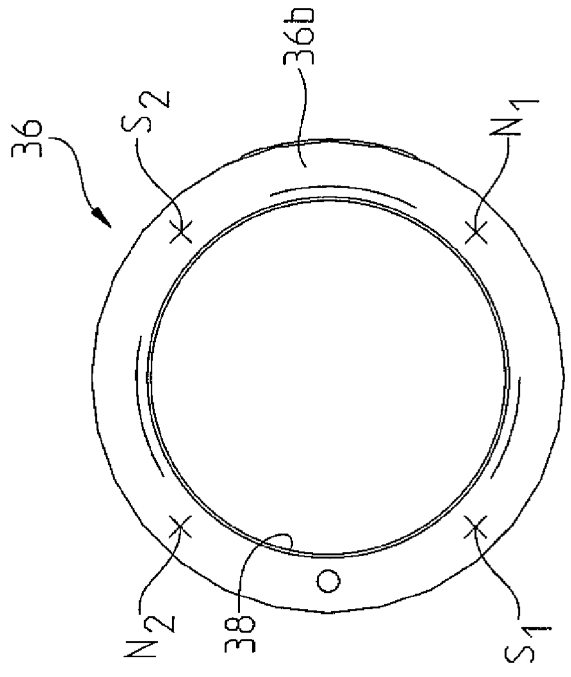

MAGNETIC COUPLING FOR SPRAYHEADS

CROSS-REFERENCE TO RELATED APPLICATION

This application is a continuation-in-part of co-pending U.S. patent application Ser. No. 11/393,450, filed Mar. 30, 2006, which claims the benefit of U.S. Provisional Application No. 60/691,389, filed Jun. 17, 2005, the disclosures of which are expressly incorporated by reference herein.

BACKGROUND AND SUMMARY OF THE INVENTION

The present invention relates to faucets having pullout sprayheads and, more particularly, to improvements in the manner by which the sprayhead is coupled and/or uncoupled from the faucet body.

Faucets having sprayheads that pull out from the faucet body enable users to manipulate the sprayhead independent of the faucet body and to aim the water spray directly at a target instead of requiring the user to place the target under the sprayhead. Such prior art faucets typically utilize locking bayonet connectors, or connectors comprising collars and snap fingers to produce a retaining force to couple the sprayhead to the faucet body.

The present invention generally provides a faucet having an improved coupling for use in coupling and uncoupling a pullout sprayhead from the body of the faucet. In one illustrative embodiment, the faucet includes a body, a supply line adapted to provide a liquid, and a head fluidly connected to the supply line. The faucet also includes a magnetic coupling. The magnetic coupling has a magnetic attracting force for releasably coupling together the head and the body, and a coupling surface supported by one of the head and the body. Further, the magnetic coupling has a first backing element to increase the magnetic attracting force and being positioned on one side of the coupling surface, a first connecting element being positioned between the coupling surface and the first backing element, and a magnetically attractive member being positioned on the other side of the coupling surface.

According to another illustrative embodiment, a method of coupling and uncoupling a faucet head from a faucet body is provided. The method includes the steps of providing a head, a body, a first connecting element and a first backing element in one of the body and the head, and a magnetically attractive member in the other of the body and the head. The method further includes the step of generating a magnetic field attracting together the head and the body, thereby coupling the head to the body.

According to a further illustrative embodiment, the faucet includes a body, a supply line adapted to provide a liquid, and a head fluidly connected to the supply line. The faucet also includes a magnetic coupling. The magnetic coupling has a magnetic attracting force for releasably coupling together the head and the body, and a coupling surface supported by one of the head and the body. The magnetic coupling has a magnetically attractive member being positioned on one side of the coupling surface, a first connector being coupled to one of the head and the body and being positioned on the other side of the coupling surface, and a first connecting element also being positioned on the other side of the coupling surface. The first connector is at least partially overmolded over the first connecting element to couple the first connecting element to one of the head and the body.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

The detailed description of the drawings particularly refers to the accompanying figures in which:

FIG. 6B is a side view of the body connector of FIG. 6A;

FIG. 6C is another side view of the body connector of FIG. 6A;

FIG. 6D is a bottom view of the body connector of FIG. 6A;

Figure 1:
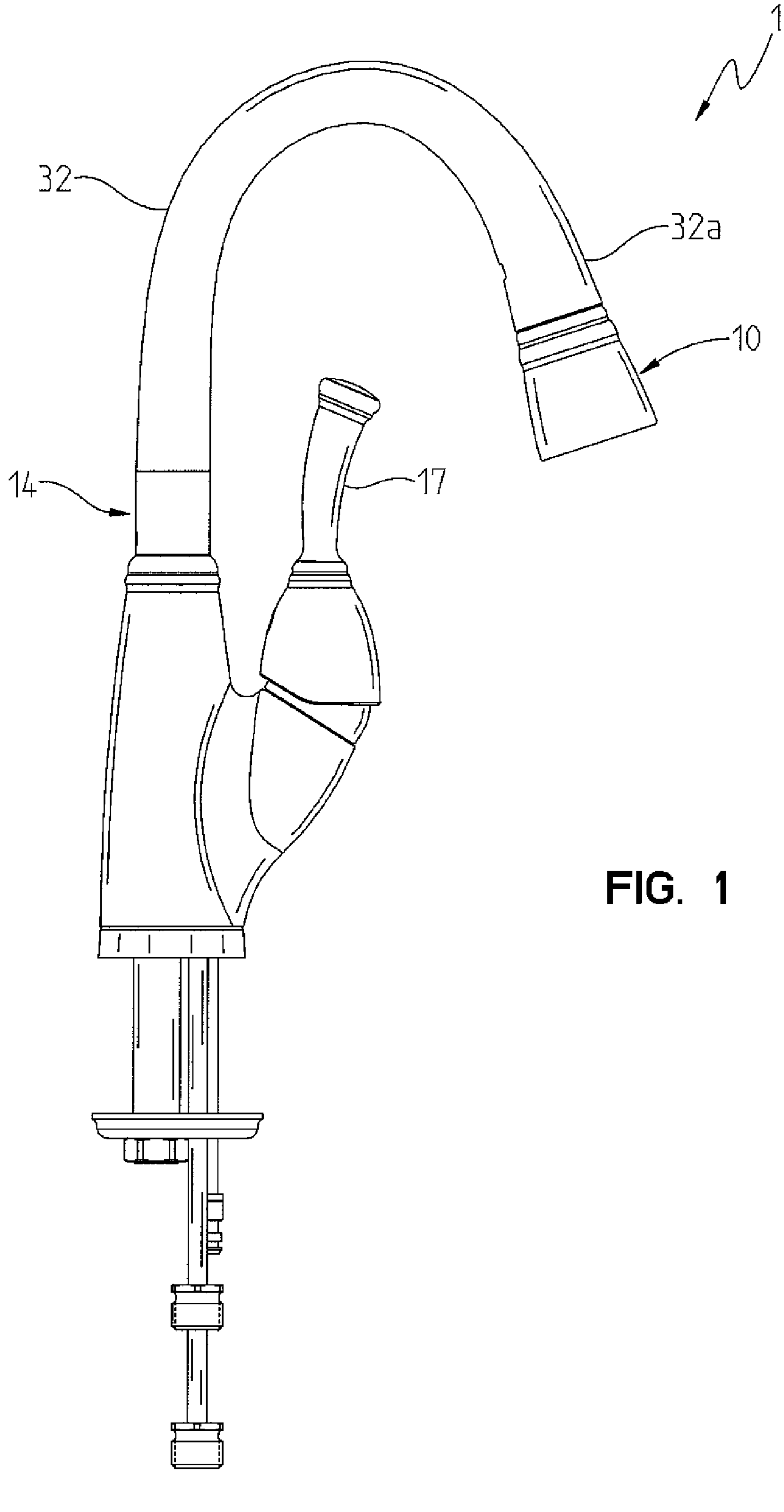
FIG. 1 is a side view of a faucet in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE DRAWINGS

The embodiments hereinafter disclosed are not intended to be exhaustive or limit the invention to the precise forms disclosed in the following description. Rather the embodiments are chosen and described so that others skilled in the art may utilize its teachings.

Figure 2:
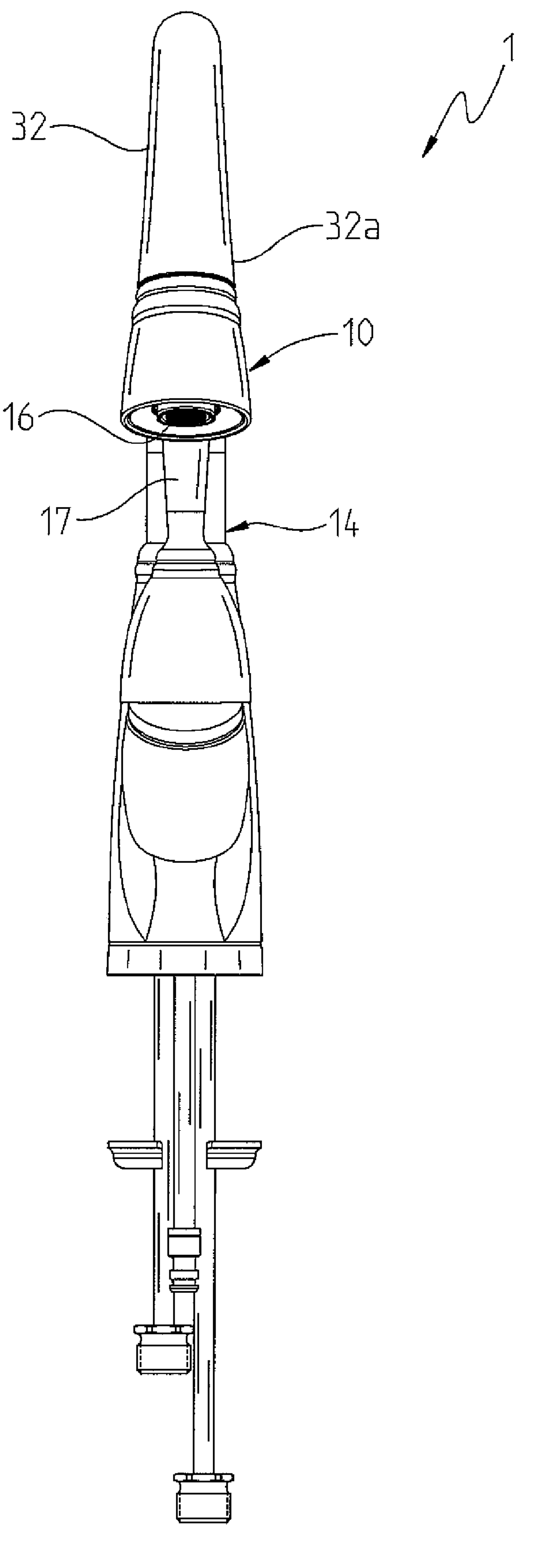
FIG. 2 is a front view of the faucet of FIG. 1.

Referring first to FIGS. 1 and 2, faucet 1 according to one embodiment of the present invention is illustrated. Faucet 1 generally includes sprayhead 10 and faucet body 14. Faucet 1 is of the type wherein sprayhead 10 may be pulled out and manipulated independent of body 14. More particularly, faucet body 14 includes neck or delivery spout 32 having dispensing end 32*a* to which sprayhead 10 is releasably coupled, as is described in further detail below.

Figure 3:
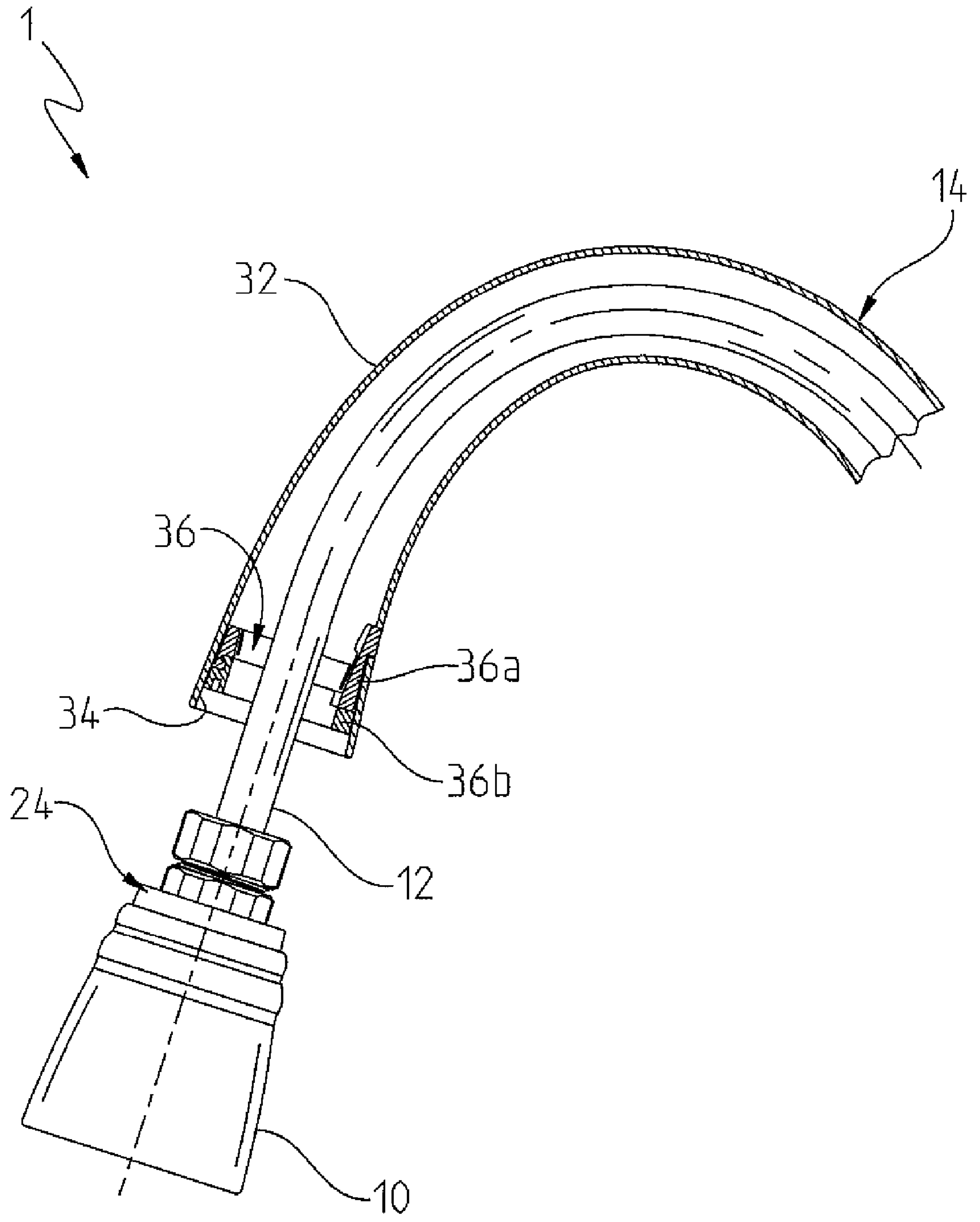
FIG. 3 is a partial cross-sectional view of a portion of the faucet of FIG. 1.
Figure 4:
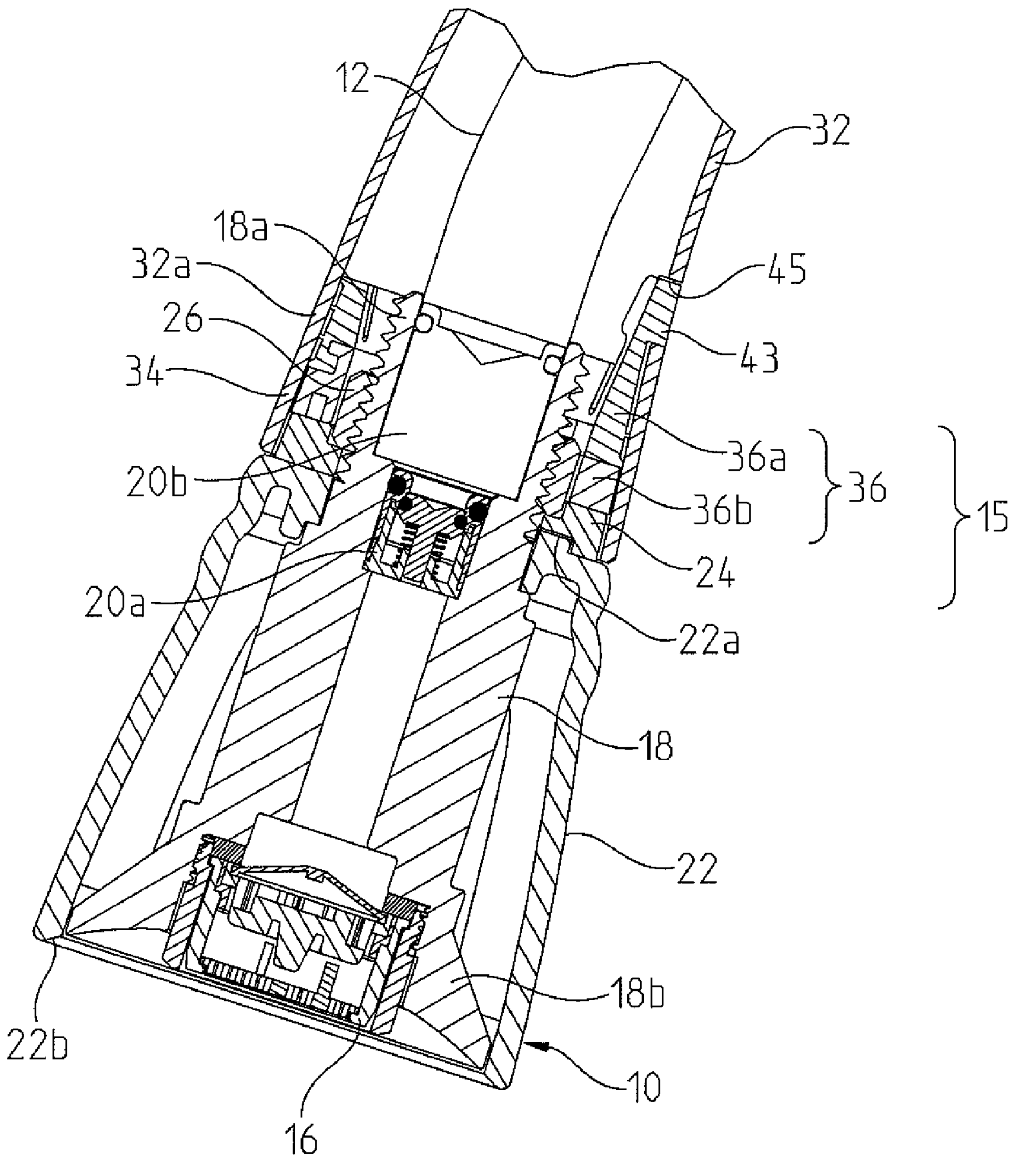
FIG. 4 is a detailed cross-sectional view of a portion of the faucet of FIG. 1.
Figure 5:
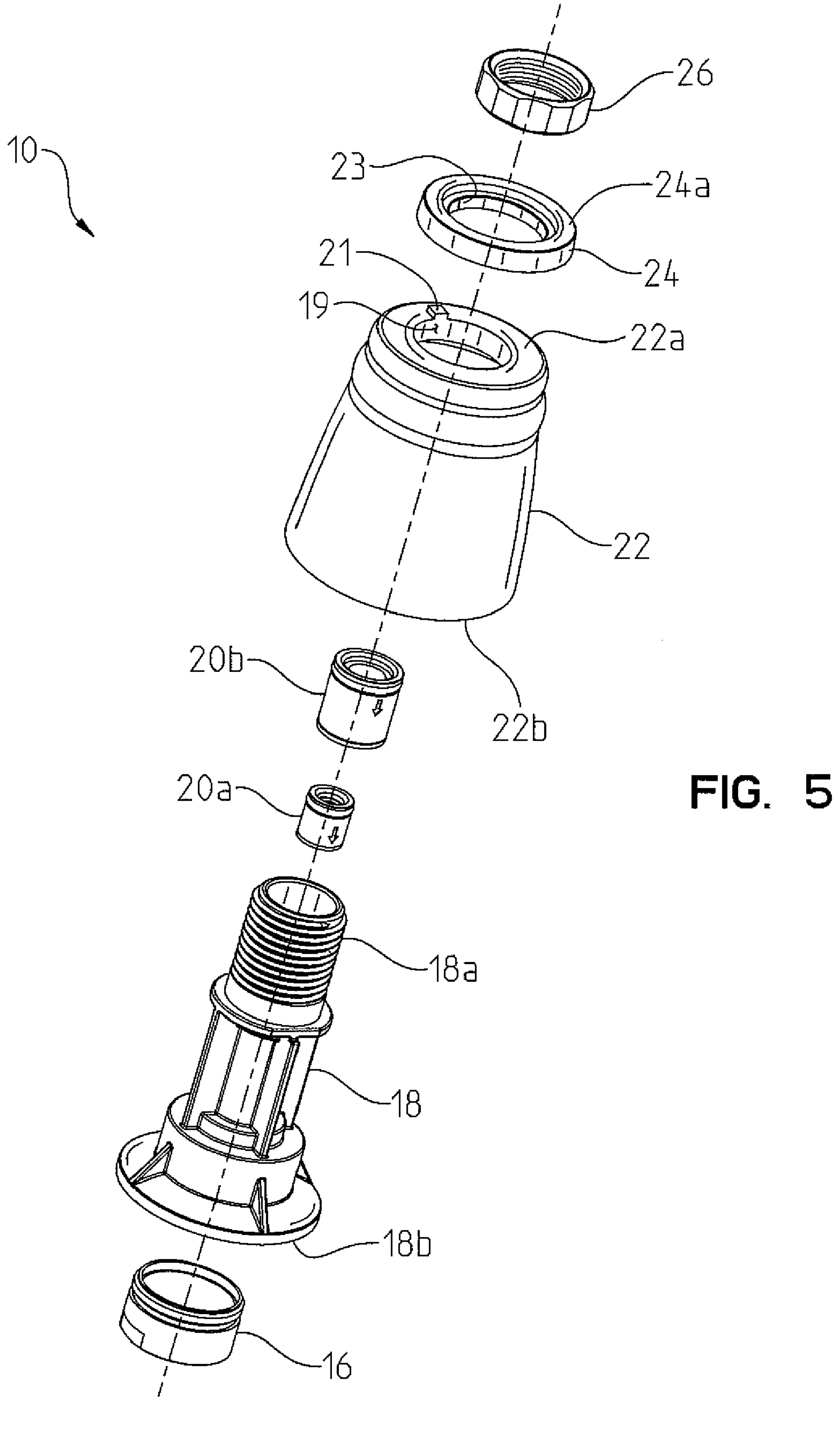
FIG. 5 is an exploded perspective view of the faucet of FIG. 4.
Figure 6A:
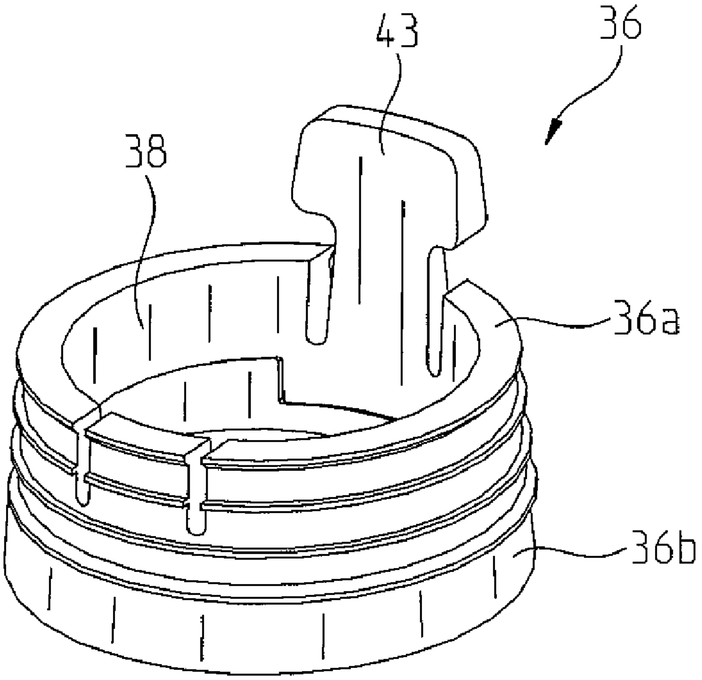
FIG. 6A is a perspective view of the body connector of the faucet of FIG. 4.
Figure 6E:
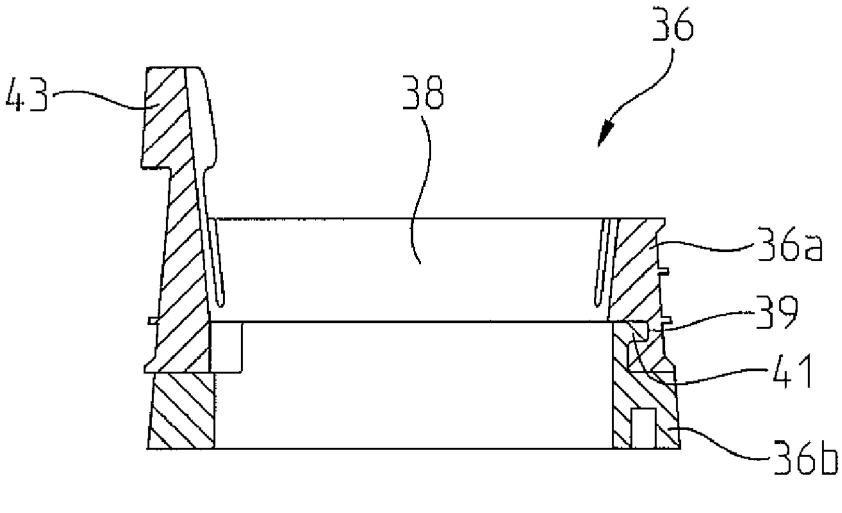
FIG. 6E is a cross-sectional view of the body connector of FIG. 6C taken along line 6E-6E.

Referring now to FIGS. 3-5, faucet 1 also includes flexible water supply line or spout tube 12, which extends through neck 32 and is fluidly coupled at a first end to a water supply source, illustratively through a valve (not shown) operably coupled to a handle 17 (FIG. 1). A second end of the water supply line 12 is fluidly coupled to sprayhead 10. The faucet 1 may include additional features detailed in U.S. patent application Ser. No. 11/325,128, filed Jan. 4, 2006, the disclosure of which is expressly incorporated by reference herein.

Sprayhead 10 is coupled to neck 32 of faucet body 14 by magnetic coupling 15. Magnetic coupling 15 generally includes head connector 24 coupled to sprayhead 10 and body connector 36 coupled to neck 32 of faucet body 14. As described in further detail below, head connector 24 and body connector 36 are adapted to releasably engage with one another to thereby releasably couple sprayhead 10 to neck 32 of faucet body 14.

Turning now to FIGS. 4 and 5, sprayhead 10 includes aerator 16, waterway member 18, check valves 20*a* and 20*b*, shell 22, head connector 24 and retaining nut 26. Aerator 16 is received in and coupled to dispensing end 18*b* of waterway member 18. Check valves 20*a*, 20*b* are received in and coupled to threaded receiving end 18*a* of waterway member 18. The assembly of aerator 16, waterway member 18 and check valves 20*a*, 20*b* are disposed within shell 22. Shell 22 includes receiving end 22*a* and opposing dispensing end 22*b*. Tab 21 protrudes from receiving end 22*a* and, as discussed in further detail below, serves to align head connector 24 on receiving end 22*a* of shell 22. When the assembly of aerator 16, waterway member 18 and check valves 20*a*, 20*b* is disposed in shell 22, threaded receiving end 18*a* extends through opening 19 in receiving end 22*a* of shell 22. Threaded receiving end 18*a* of waterway member 18 also extends through opening 23 of head connector 24 and receives retaining nut 26, which secures head connector 24 to shell 22. Threaded receiving end 18*a* of waterway member 18 then extends from nut 26 and is fluidly coupled with water supply line 12.

Turning to FIGS. 5 and 7A-7E, head connector 24 is substantially ring-shaped and includes top surface 24*a*, opposing bottom surface 24*b* and opening 23 extending therethrough from top surface 24*a* to bottom surface 24*b*. Opening 23 is sized to receive threaded receiving end 18*a* of waterway member 18 therethrough. Notch 25 is cut into bottom surface 24*b* and is configured to receive tab 21 of shell 22 to facilitate proper angular orientation therebetween.

Referring now to FIGS. 4 and 6A-6E, body connector 36 is disposed within dispensing end 32*a* of neck 32. A portion of neck 32 extends past body connector 36 to form collar 34, which is configured to removably and concentrically receive therein head connector 24 and receiving end 18*a* of waterway 18. Body connector 36 includes opening 38, which extends through body connector 36 and is configured to receive receiving end 18*a* of waterway member 18 therethrough. Body connector 36 includes base 36*a* and connecting element 36*b*. Base 36*a* illustratively serves to couple body connector 36 to faucet body 14, while connecting element 36*b* interacts with head connector 24 to releasably couple sprayhead 10 to faucet body 14, as is described in further detail below.

Base 36*a* includes resilient clip or snap finger 43 extending upwardly and outwardly therefrom. Slot 45 extends through neck 32 of faucet body 14 and is configured to receive clip 43. Clip 43 is snap-received within slot 45 to secure body connector 36 in neck 32 of faucet body 14. Recess 39 extends into and about a portion of the inner periphery of base 36*a*. Lip 41 extends from and about a portion of the outer periphery of connecting element 36*b*. Lip 41 is configured to engage with recess 39 to thereby couple connecting element 36*b* to base 36*a*. Base 36*a* may be formed of any suitable material.

Body connector 36 need not include two separate components. Rather base 36*a* and connecting element 36*b* may be integrally formed as a single unit, such that body connector 36 is one piece. In one embodiment, base 36*a* is formed of polymers and is at least partly overmolded to connecting element 36*b*. In another embodiment, base 36*a* is fully overmolded to connecting element 36*b* and encapsulates connecting element 36*b*. Overmolding is configured to protect the connecting elements from corrosion due to contact with fluids including water. Alternatively, corrosion may be prevented by coating or plating connecting elements. However, coatings and plating materials may be brittle and may crack due to the compressive forces that impinge on connecting elements when they are pressed into the faucet head or body. Cracking tendencies are exacerbated by large fluid temperature differences which may range from about 32° F. to about 212° F. in various faucet applications. In one embodiment, base 36*a* is formed of glass-filled polypropylene. Glass-filled polypropylene flows well in an injection-molding die and has good rigidity characteristics so that thin overmolding layers may be produced. In another embodiment, base 36*a* is formed of acetal. Acetal has good hysteresis characteristics and resists flexing fatigue.

Overmolding might create a larger gap between the connecting elements than that created by coating or plating. Gaps reduce the magnetic attractive force between connecting elements in proportion to the gap distance. The magnetic flux density of a magnetic connecting element, which corresponds to the attractive force, may be increased by increasing its surface area, thickness, or magnetic material to compensate for the increased gap. These options are generally accompanied by increases in cost. Also, an application may be size-constrained for practical or aesthetic reasons. In the case of a kitchen, bath or roman-tub faucet, products must be aesthetically pleasing and must fit within standardized openings provided in sinks, tubs and other faucet support devices.

Magnets have magnetic fields characterized by their strength and orientation. Magnetic poles are limited regions in the magnet at which the field of the magnet is most intense, each of which is designated by the approximate geographic direction to which it is attracted, north (N) or south (S). The direction of the magnetic field is the direction of a line that passes through the north and south poles of the magnet. Generally, the direction is perpendicular to the magnetic surface of the magnet. The orientation of the field may be characterized as the direction pointed to by the north pole of the magnet.

Magnets may be characterized in several different ways. For instance, the magnet type may be a permanent magnet or an electromagnet. A permanent magnet exhibits a permanent (i.e. constant) magnetic field. An electromagnet generates a magnetic field only when a flow of electric current is passed through it. The magnetic field generated by the electromagnet disappears when the current ceases.

Magnets with a single magnetic field are considered dipolar because they have two poles, a north and a south pole. The magnetic field of a dipolar magnet may interact with the magnetic field of other magnets to produce a repelling or an attracting force. The magnetic field may also interact with certain attractable materials, such as iron or steel, that are naturally attracted to magnets.

The strength of the attracting or repelling magnetic force is determined by the strength of the magnetic field of the magnet and by the degree of interaction between the magnetic field and a component that enters the field. The strength of a magnetic field is determined by the construction of the magnet. The strength of an electromagnetic field can be changed by changing the current that flows through the electromagnet. The degree of interaction is determined by the size of the magnetic surface that interacts with the component entering the field and by the distance between the magnet and the component entering the field. The magnetic force of a magnet, therefore, may be changed by changing the position of the magnet relative to another magnet or to the attractable material.

Figure 11A:
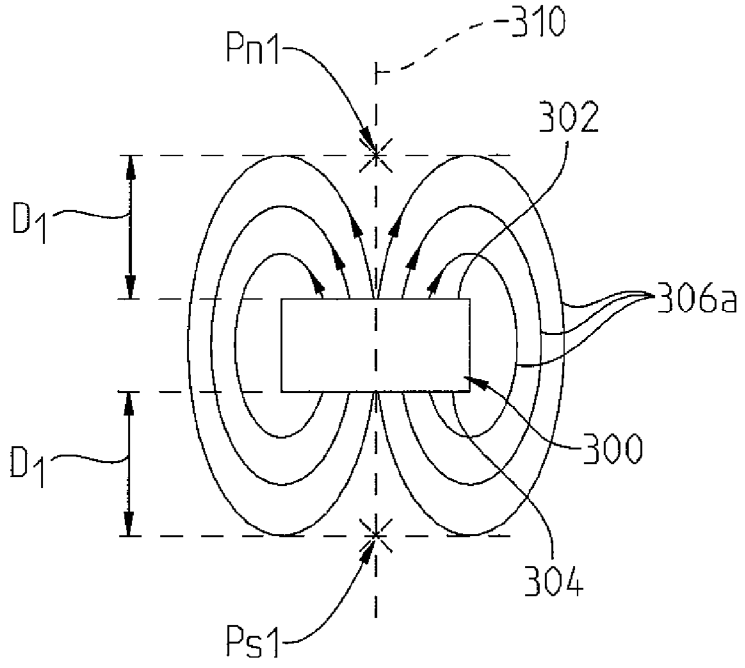
FIG. 11A is a conceptual diagram of the flux lines of a magnetic field of a rectangular magnet.
Figure 11B:
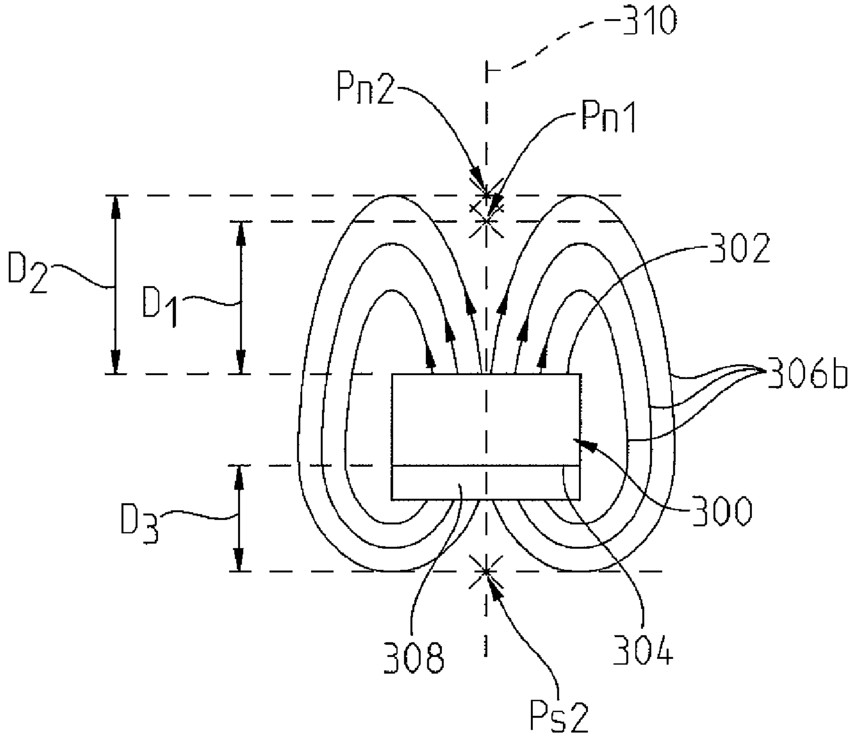
FIG. 11B is a conceptual diagram of the flux lines of a magnetic field of a rectangular magnet coupled to a backing element.

A backing element may increase the attractive force of a magnetic coupling. Referring now to FIGS. 11A and 11B, the magnetic flux densities of two magnetic fields are conceptually represented by magnetic flux lines 306*a* and 306*b*. FIG. 11A shows magnet 300 having magnetic flux lines 306*a* that extend from both surfaces 302, 304 connecting its north and south poles. Spaced-apart surfaces 302, 304 define the thickness of magnet 300. At points $P_{N1}$ and $P_{S1}$ located at a distance $D_1$ perpendicularly away from surfaces 302 and 304, respectively, on centerline 310, the magnetic field equals F gauss.

FIG. 11B shows magnet 300 coupled to backing element 308, and having flux lines 306*b* that extend from surface 302 to and through backing element 308 to surface 304 connecting its north and south poles. At points PN2 and PS2 located at corresponding distances D2 and D3 perpendicularly away from surfaces 302 and 304, respectively, on centerline 310, the magnetic field also has a value equal to F gauss. D2 is greater than both D1 and D3 meaning that the magnetic field strength changed as a result of the addition of backing element 308 and that backing element 308 increased the strength of the magnetic field at point PN1 a distance D1 perpendicularly away from surface 302. A suitable backing element may be a plate comprising steel, iron, and other non-magnetic magnetically attractive materials. Depending on the selection of materials and particular designs, the magnetic flux density at a distance away from the surface of magnet 300 may be increased more by the addition of backing element 308 than by an increase in the thickness of magnet 300 equal to the thickness of backing element 308. Thus, a stronger attractive force may be achieved with a smaller, less costly, corrosion resistant connector.

Figure 12A:
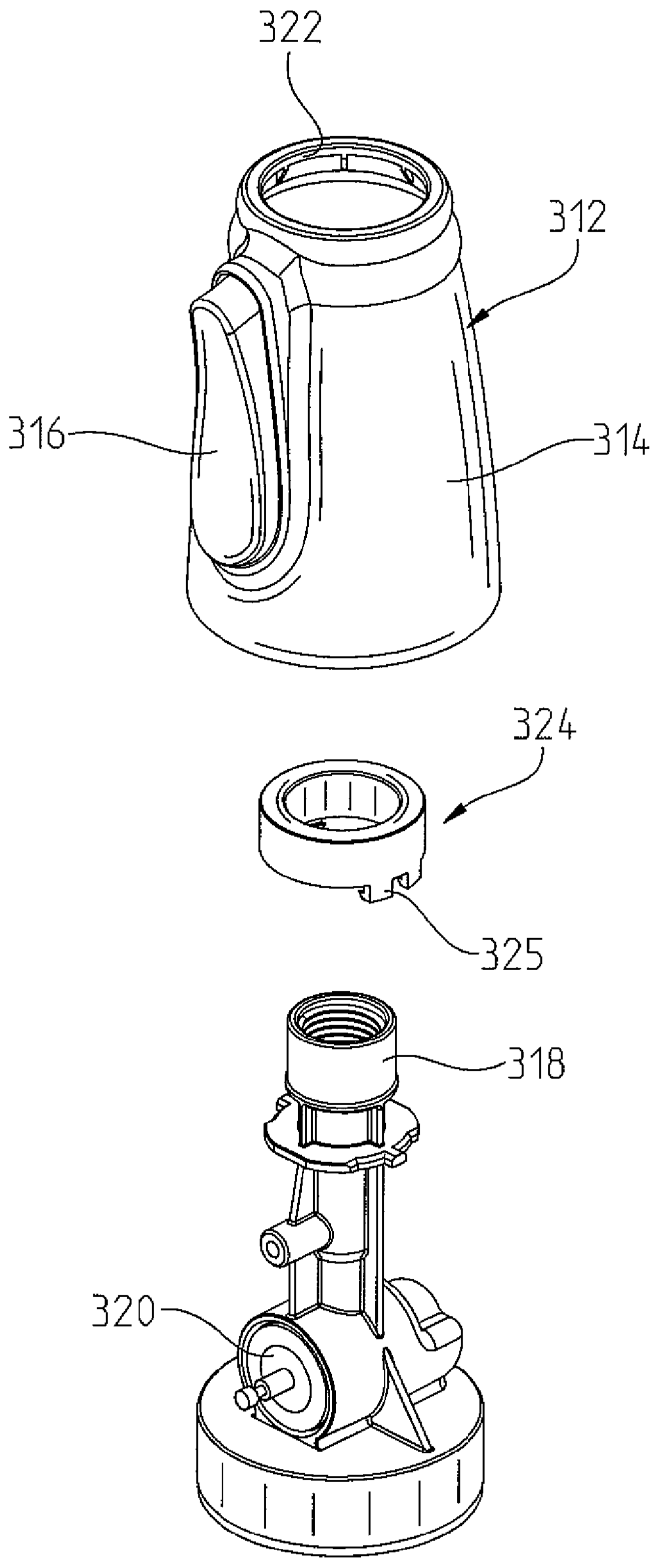
FIG. 12A is an exploded perspective view of a faucet head including a magnetic connector having a backing element.
Figure 12B:
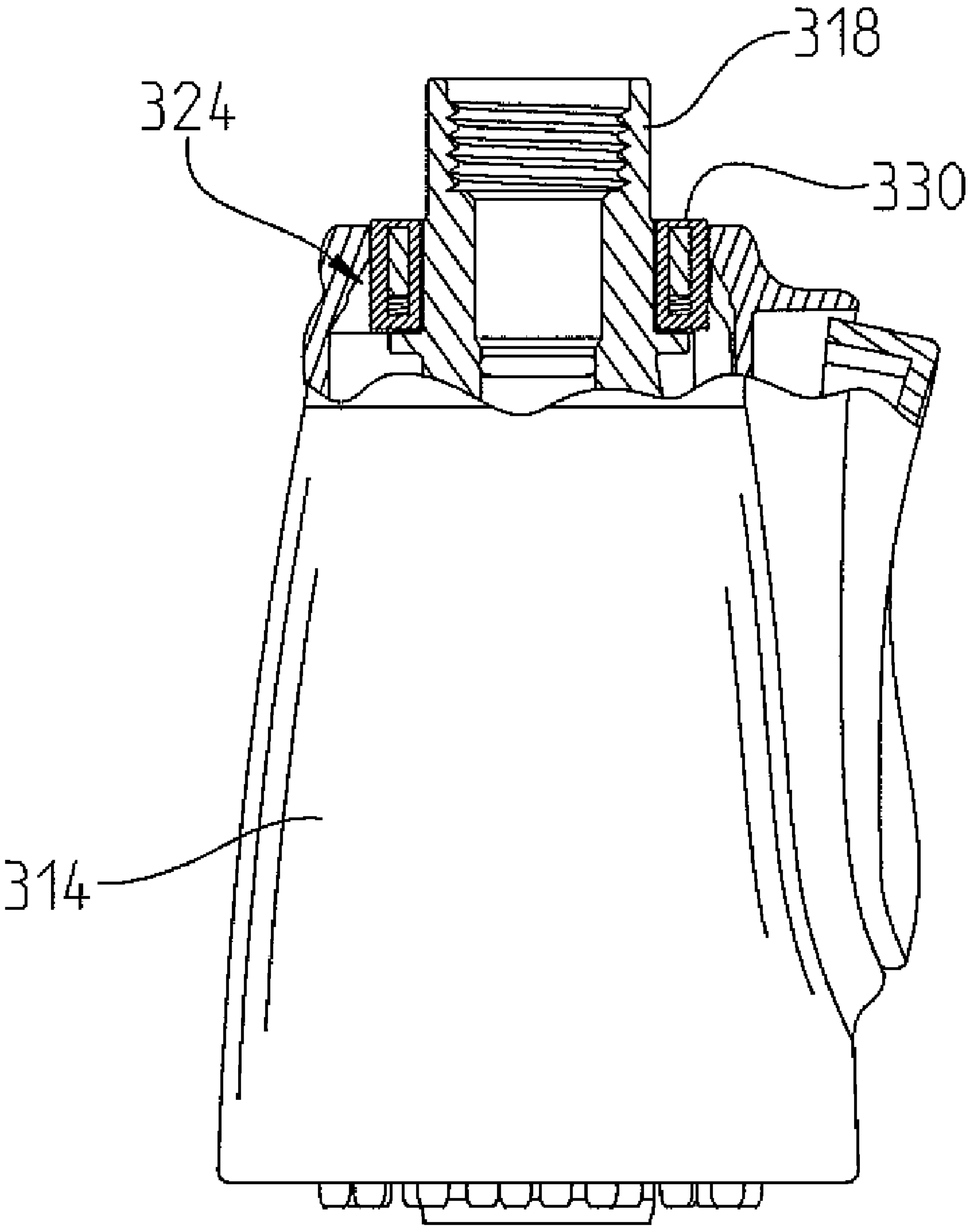
FIG. 12B is a side view of the faucet of FIG. 12A showing a partial detailed cross-section of the magnetic connector positioned in the faucet head.
Figure 13A:
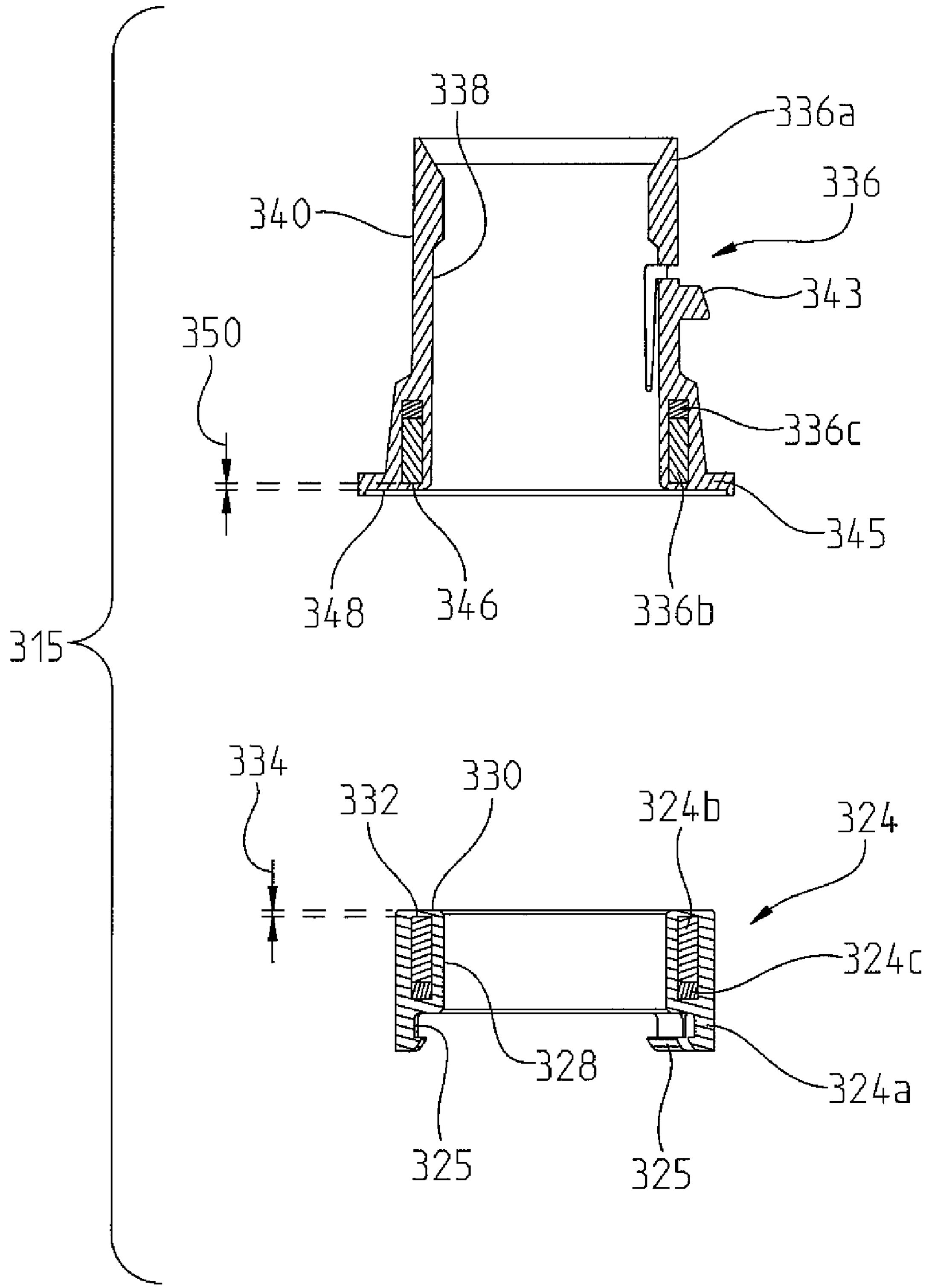
FIG. 13A is a cross-sectional side view of an alternative magnetic coupling showing magnetic connectors including connecting elements and backing elements.
Figure 13B:
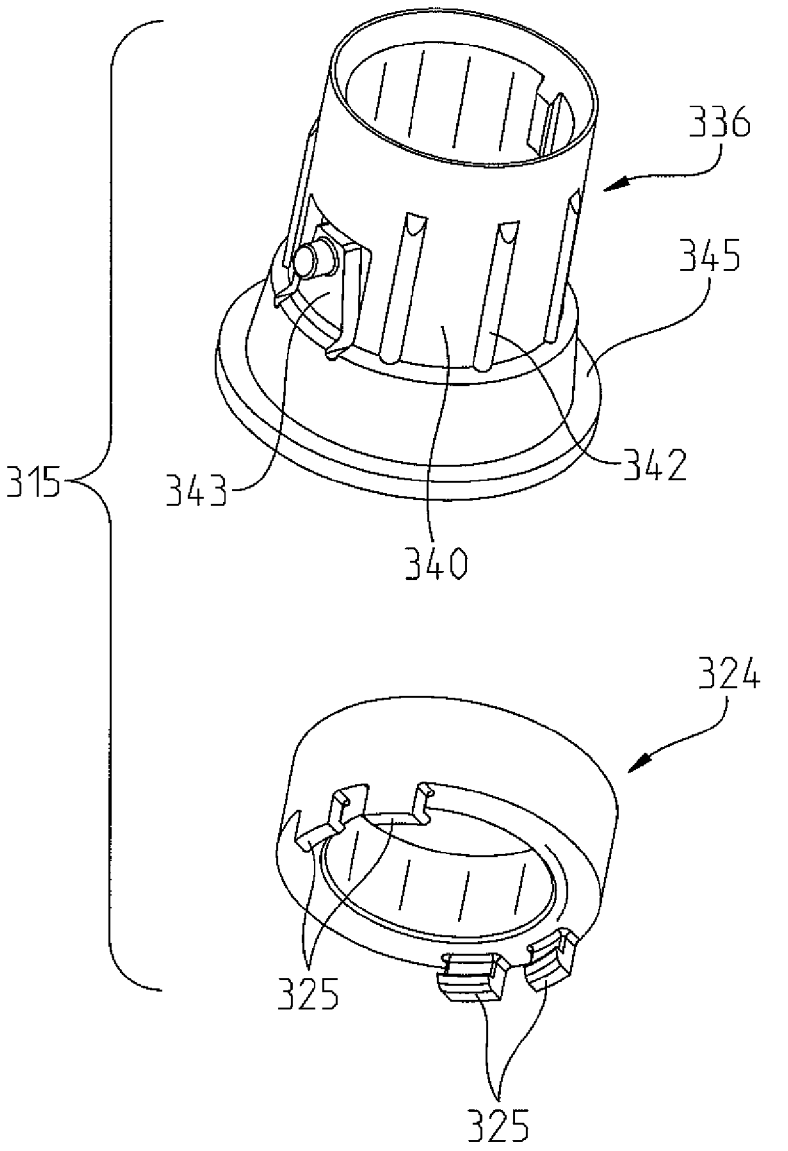
FIG. 13B is a perspective view of the alternative magnetic coupling of FIG. 13A.

Exemplary embodiments of connectors having overmolded connecting elements and backing elements are shown in FIGS. 12A, 12B, 13A, 13B and 13C. Referring now to FIGS. 12A and 12B, an alternative faucet head 312 comprises a body 314 having an opening 322, a head connector 324 and a dispensing portion 318. Head connector 324 is explained in detail with reference to FIGS. 13A and 13B. Body 314 includes lever 316 adapted to activate waterflow valve 320 to dispense water. Head connector 324 couples to water dispensing portion 318 by means of clips 325. FIG. 13B is a partial cross-sectional view of body 314 showing head connector 324 positioned on dispensing portion 318 and having surface 330 protruding through opening 322.

FIGS. 13A and 13B show magnetic coupling 315 comprising a pair of connectors. While either connector may be positioned in a body or head of a faucet, connector 336 will be described as a body connector and connector 324 will be described as a head connector for ease of explanation.

Body connector 336 includes opening 338 extending through it and being configured to receive a water supply line therethrough. Body connector 336 includes base 336*a*, connecting element 336*b*, and backing element 336*c*. Body connector base 336*a* is overmolded to encapsulate connecting element 336*b* and backing element 336*c*. Body connector base 336*a* further includes clip or snap finger 343. Body connector base 336*a* has an external profile 340 having ribs 342 designed to fit tightly inside the neck of a faucet. Optionally, body connector base 336*a* has an outwardly protruding lip 345 designed to fit against the edge of the receiving end of the neck of a faucet without a collar. Body connector base 336*a* encapsulates connecting element 336*b* with material disposed over a surface 346, the encapsulating layer having a spaced-apart external surface 348 defining a layer thickness 350.

Figure 13C:
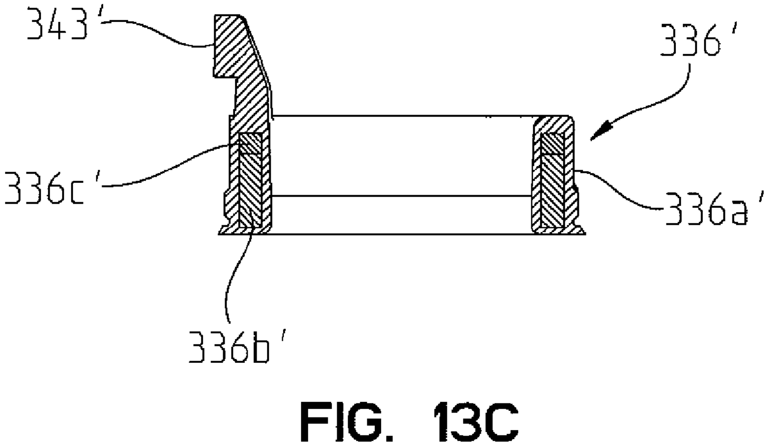
FIG. 13C is a cross-sectional side view of an alternative magnetic connector.

In another embodiment, body connector 336 does not have a lip and fits inside neck 32 as a suitable replacement for body connector 36. An embodiment of connector 336 without lip 345 is shown in FIG. 13C and denoted as connector 336'. Connector 336' includes base 336*a'*, connecting element 336*b'*, and backing element 336*c'*. Body connector base 336*a'* is overmolded to encapsulate connecting element 336*b'* and backing element 336*c'*. Body connector base 336*a'* further includes clip or snap finger 343'.

FIGS. 13A and 13B also show head connector 324. Head connector 324 includes opening 328 extending through it and being configured to receive water dispensing portion 318 therethrough. Head connector 324 includes base 324*a*, connecting element 324*b*, and backing element 324*c*. Head connector base 324*a* is overmolded to encapsulate connecting element 324*b* and backing element 324*c*. Head connector base 324*a* further includes clips 325 for securing head connector 324 to water dispensing portion 318. Head connector base 324*a* encapsulates connecting element 324*b* with material disposed over a surface 332, the encapsulating layer having a spaced-apart external surface 330 defining a layer thickness 334.

Figure 13D:
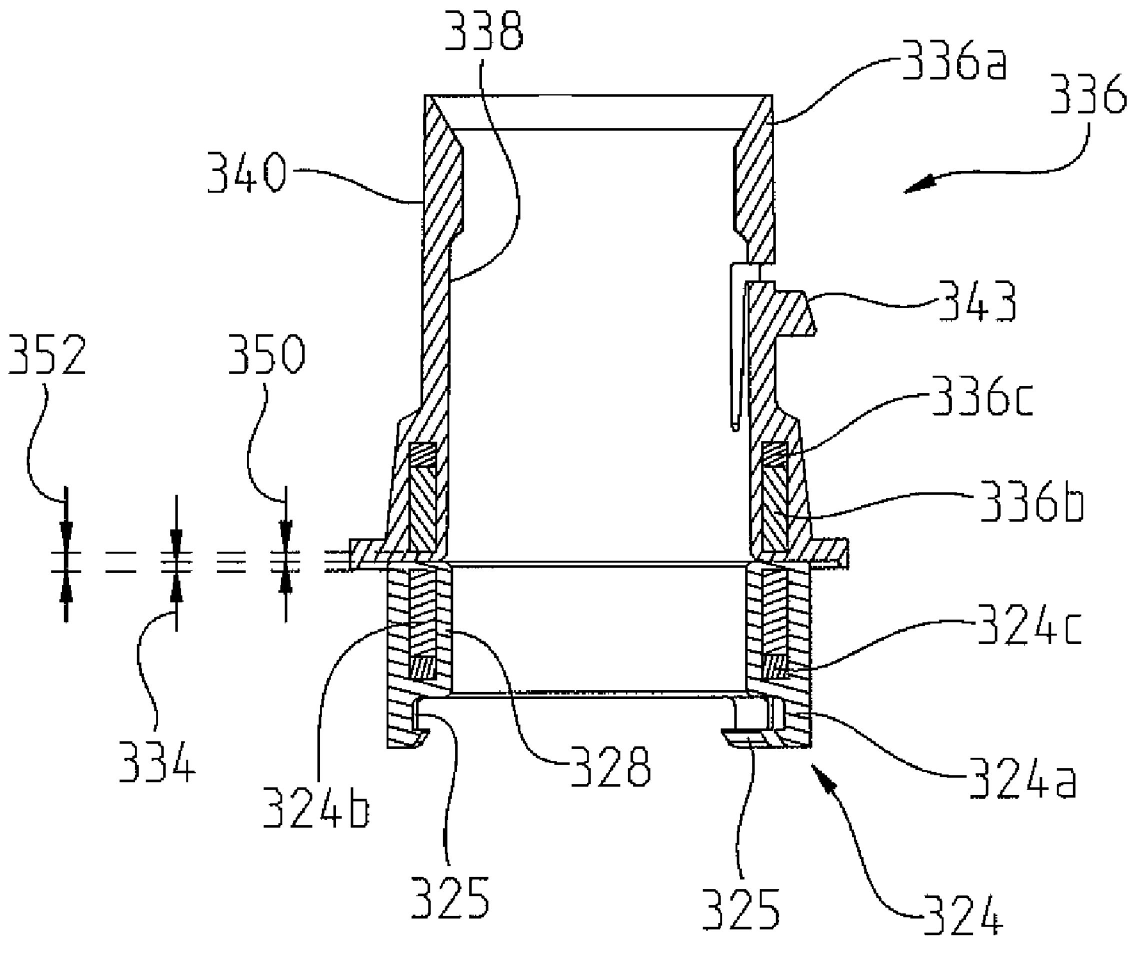
FIG. 13D is a cross-sectional side view of the magnetic coupling of FIG. 13A.

Referring now to FIG. 13D, magnetic coupling 315 has a gap 352 having a gap distance equal to the sum of thicknesses 334 and 350 of the encapsulating layers. In one embodiment, the overmolding material is acetal, thicknesses 334 and 350 are 0.025 inches thick, and the gap distance is 0.050 inches. Connecting elements 336*b* and 324*b* comprise NdFeB, a permanent magnet material typically referred to as neodymium or neo. The external surfaces 348 and 330 contact each other to form the coupling surface of magnetic coupling 315 (FIG. 13A).

Backing elements 336*c* and 324*c* focus the magnetic fields to increase the attractive force and compensate for the loss of force created by gap 352. In one embodiment, a pulling force of between 2 and 12pounds is required to pull apart head connector 324 from body connector 336. In a further illustrative embodiment, the pulling force required to separate head connector 324 from body connector 336 is between 3 and 8 pounds. In yet another illustrative embodiment, the pulling force is between 3.5 and 6 pounds. In one embodiment, each of connectors 336 and 324 have a coupling surface area between 0.4 and 2.0 square inches. In another embodiment, each of connectors 336 and 324 have a coupling surface area between 0.5 and 1.0 square inches. In one embodiment, each of connectors 336 and 324 have a magnetic field of between 400 and 2000 gauss tested at 0.090 inches. In another embodiment, each of connectors 336 and 324 have a magnetic field of between 500 and 1000 gauss tested at 0.090 inches. In one embodiment, the gap is in a range between 0.00 and 0.01 inches. In another embodiment, the gap is in a range between 0.040 and 0.080 inches. In one embodiment, the magnetic couplings satisfy the 24 hour CASS salt sprayer test according to ASTM-368. Each of connectors 324, 336 may be dipolar or multipolar.

Figure 7A:
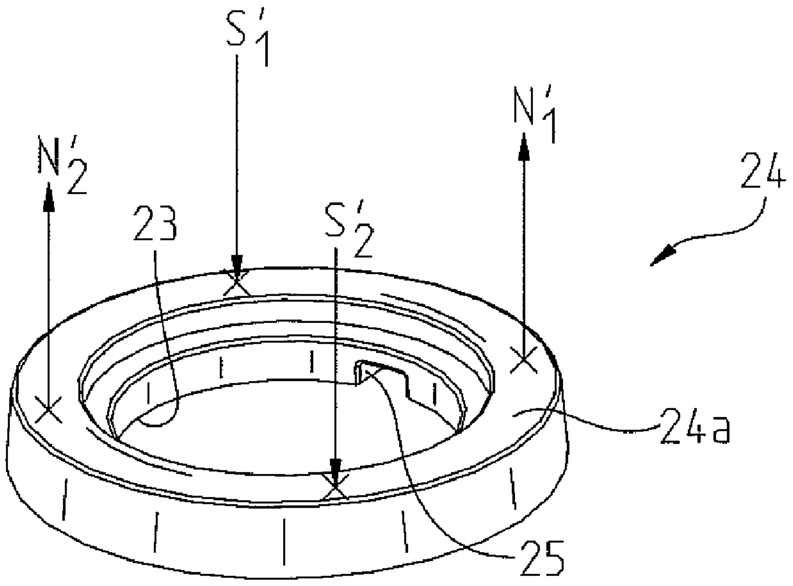
FIG. 7A is a perspective view of the head connector of the faucet of FIG. 4.
Figure 7E:
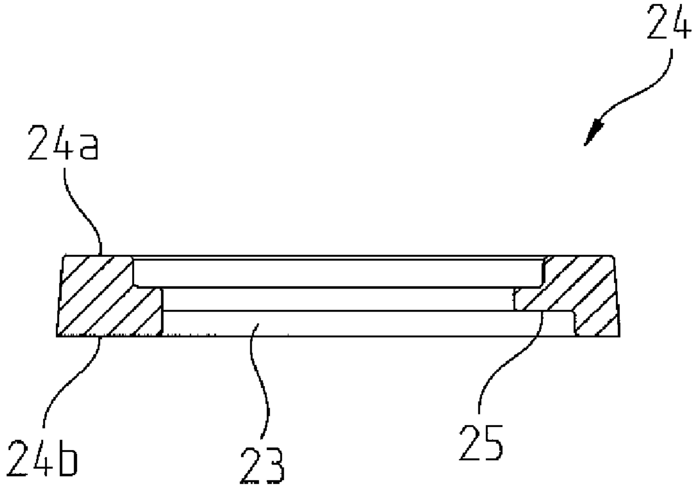
FIG. 7E is a cross-sectional view of the head connector of FIG. 7C taken along line 7E-7E.
Figure 7B:
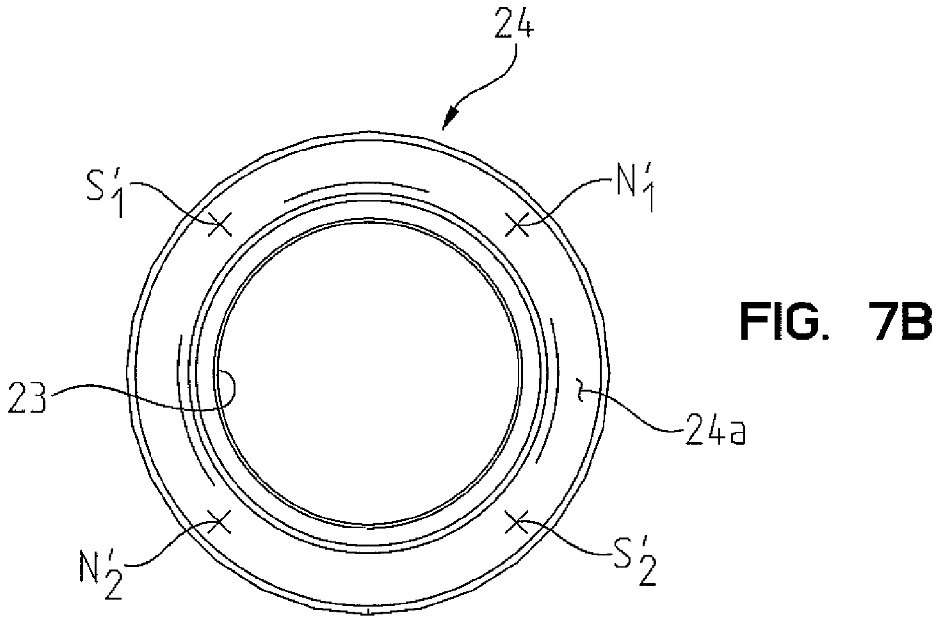
FIG. 7B is a top view of the head connector of FIG. 7A.
Figure 7C:
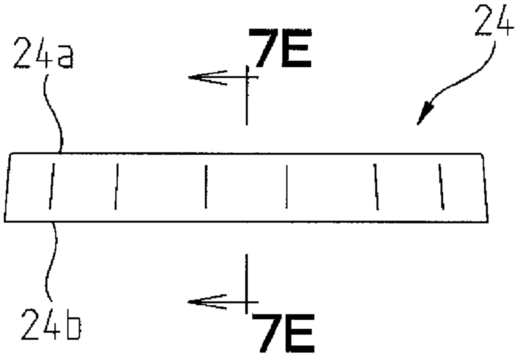
FIG. 7C is a side view of the head connector of FIG. 7A.
Figure 7D:
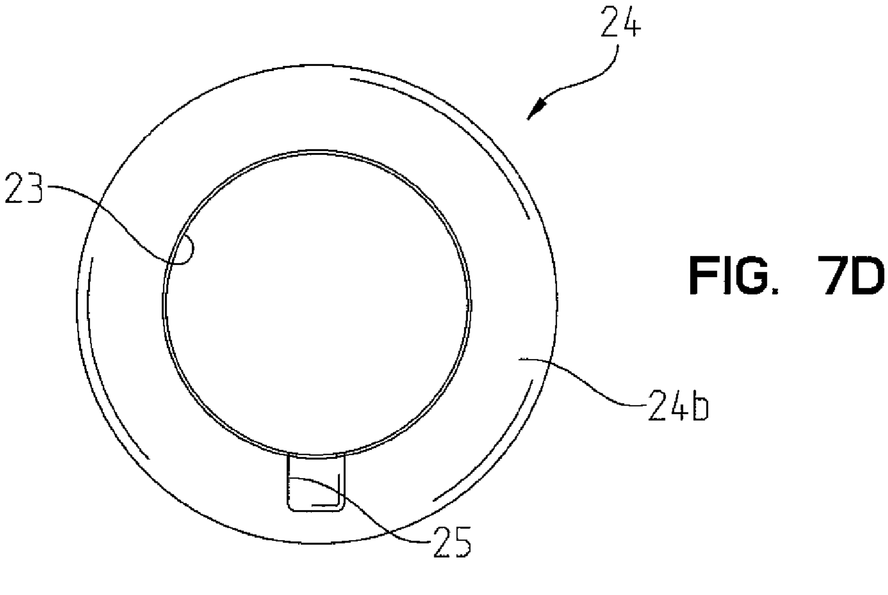
FIG. 7D is a bottom view of the head connector of FIG. 7A.

Referring again to FIGS. 3, 4, 6D, 7A, 7B, 8A, and 8B, the interaction between connecting element 36*b* of body connector 36 with head connector 24 to releasably couple sprayhead 10 to faucet body 14 will now be described. As shown in FIGS. 6D, 7A, and 7B and diagrammatically in FIGS. 8A and 8B, head connector 24 and connecting element 36*b* of body connector 36 may be in the form of magnets adapted to attract one another.

Unlike-poles attract and like-poles repel. Accordingly, when two dipolar magnets come into close proximity and their magnetic fields are oriented in the same direction, they attract one another. The north pole on the proximal surface of one magnet attracts the south pole on the proximal surface of the other magnet. On the other hand, when two dipolar magnets come into close proximity and their magnetic fields are oriented in opposite directions, they repel one another. For example, the north pole on the proximal surface of one magnet repels the north pole on the proximal surface of the other magnet.

Magnets may also include multiple magnetic fields with some fields oriented in a first direction and other fields oriented in a second direction that is opposite the first direction. When two multi-field magnets come in close proximity to one another, they will repel one another if the multiple fields are not oriented in the same direction and will attract one another if they are oriented in the same direction. Multi-field magnets provide two modes of operation: an attracting mode and a repelling mode. Couplings including multi-field magnets may be referred to as bi-modal couplings.

Figure 8A:
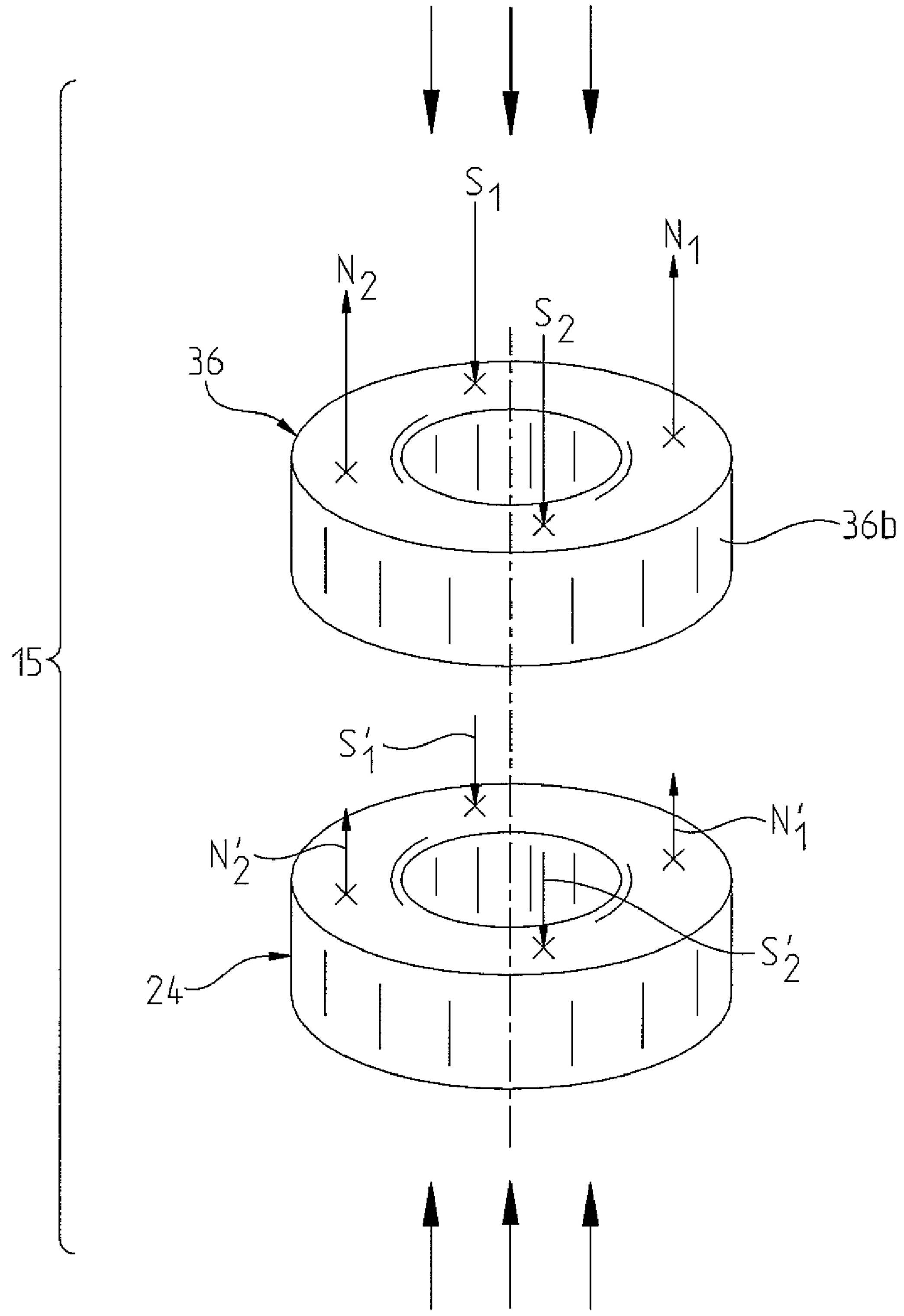
FIG. 8A is diagrammatic view of the magnetic coupling of the faucet of FIG. 4 in the attracting mode.
Figure 8B:
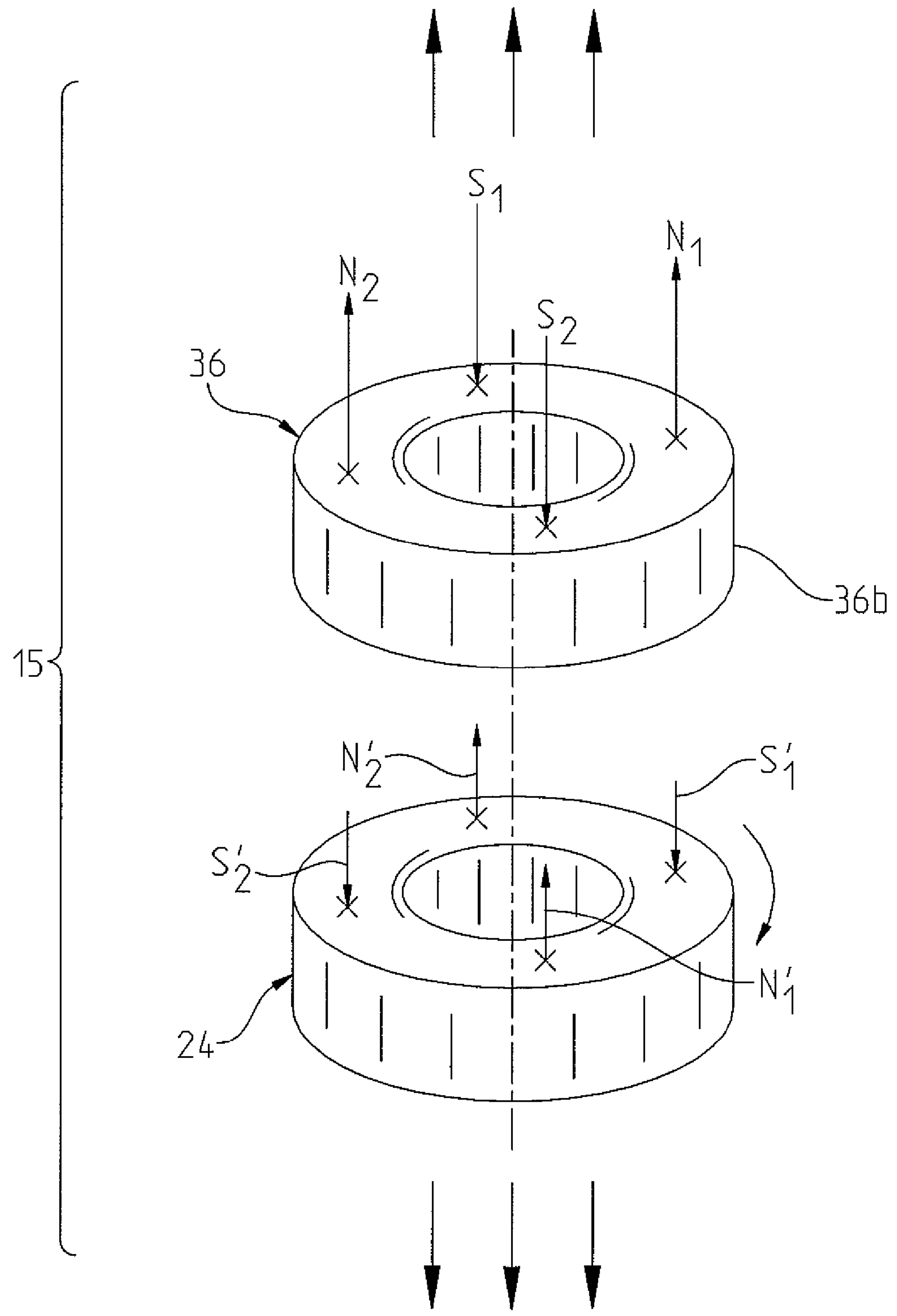
FIG. 8B is a diagrammatic view of the magnetic coupling of the faucet of FIG. 4 in the repelling mode.

As shown in FIGS. 8A and 8B, magnetic coupling 15 may be bi-modal in that it includes an attracting mode (FIG. 8A) and a repelling mode (FIG. 8B), and may be adjusted between the two modes. In this case, as further shown in FIGS. 6D, 8A, and 8B, connecting element 36*b* of body connector 36 includes multiple magnetic fields $S_1$, $N_1$, $S_2$, $N_2$ arranged alternately in opposing directions. Similarly, as shown in FIGS. 7A, 7B, 8A, and 8B, head connector 24 includes multiple magnetic fields $S_1'$, $N_1'$, $S_2'$, $N_2'$ arranged alternately in opposite directions. With reference to FIG. 8A, in the attracting mode, head connector 24 is arranged relative to body connector 36 such that magnetic fields $S_1'$, $N_1'$, $S_2'$, and $N_2'$ of head connector 24 are aligned with and oriented in the same direction as magnetic fields $S_1$, $N_1$, $S_2$, and $N_2$ of body connector 36, respectively. In this orientation, when head connector 24 is brought in close proximity to body connector 36, the two are attracted to one another, as indicated by the solid-headed arrows. Turning to FIG. 8B, head connector 24 has been rotated clockwise by approximately 90 degrees, such that magnetic fields $S_1'$, $N_1'$, $S_2'$, and $N_2'$ of head connector 24 are now aligned with and oriented in directions opposite to magnetic fields $N_1$, $S_2$, $N_2$ and $S_1$, respectively, of body connector 36. In this orientation, when head connector 24 is brought in close proximity to body connector 36, the two are repelled from one another as indicated by the solid-headed arrows.

Referring to FIGS. 3, 4, 8A, and 8B, in practical operation of faucet 1, magnetic coupling 15 releasably couples sprayhead 10 to neck 32 of faucet body 14 using the attracting mode shown in FIG. 8A. In other words, magnetic fields $S_1$, $N_1$, $S_2$, and $N_2$ of body connector 36 are respectively aligned with and oriented in the same direction as magnetic fields $S_1'$, $N_1'$, $S_2'$, and $N_2'$ of head connector 24, such that head connector 24 and the remaining components of sprayhead 10 are attracted and held to body connector 36, as shown in FIG. 4. When the user desires to pull sprayhead 10 out from neck 32, the user may simply pull sprayhead 10 away from neck 32 with enough force to overcome the attracting magnetic forces between head connector 24 and body connector 36. To ease the release of sprayhead 10 from neck 32, the user may also rotate sprayhead 10 by approximately 90 degrees and, thus, head connector 24, until magnetic coupling 15 exhibits its repelling mode, shown in FIG. 8B. In other words, sprayhead 10 may be rotated until magnetic fields $S_1'$, $N_1'$, $S_2'$, and $N_2'$ of head connector 24 are oriented in opposite directions relative to magnetic fields $N_1$, $S_2$, $N_2$ and $S_1$ of body connector 36. In this orientation, coupling 15 assists the user in pulling sprayhead 10 from neck 32 by providing a repelling force that repels head connector 24 from body connector 36.

Figure 9:
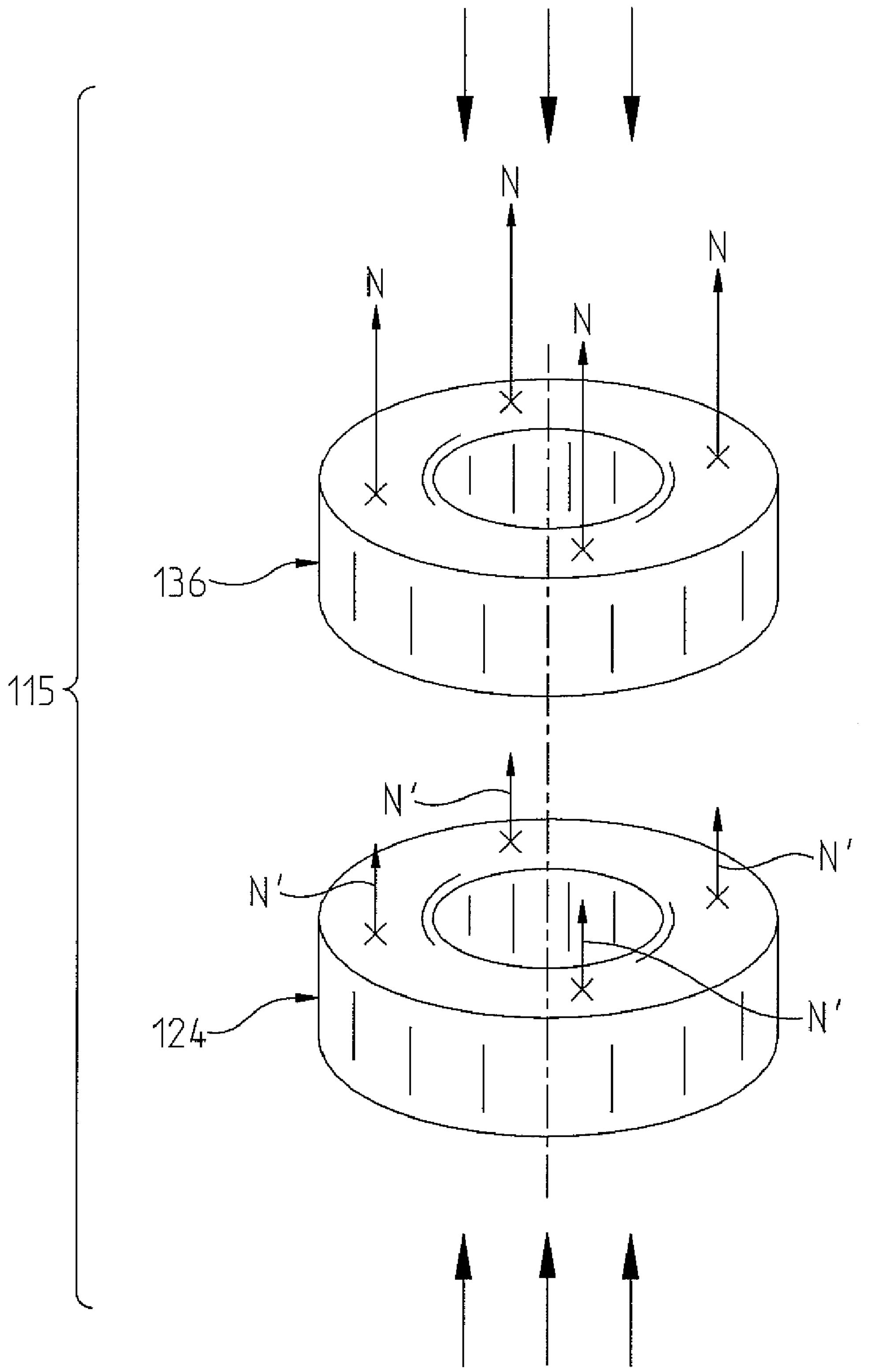
FIG. 9 is a diagrammatic view of an alternative magnetic coupling for use in the faucet of FIG. 4.

The magnetic coupling of sprayhead 10 to body 14 may be achieved without the use of multi-field magnets. Faucet 1 may be equipped with uni-modal magnetic coupling 115 through the use of dipolar magnets, as schematically illustrated in FIG. 9. Magnetic coupling 115 includes head connector 124 and body connector 136, which may be respectively coupled to sprayhead 10 and body 14 in a manner similar to that of magnetic coupling 15 described above. Head connector 124 includes only one magnetic field N, while body connector 136 includes only one magnetic field N', which is oriented in the same direction as magnetic field N. Accordingly, when the sprayhead 10 is brought in close proximity to neck 32 of faucet body 14, body connector 136 attracts and holds head connector 124 thereto. To release sprayhead 10 from neck 32, the user pulls sprayhead 10 away from neck 32 with enough force to overcome the attractive force between body connector and head connectors 136 and 124.

Figure 10:
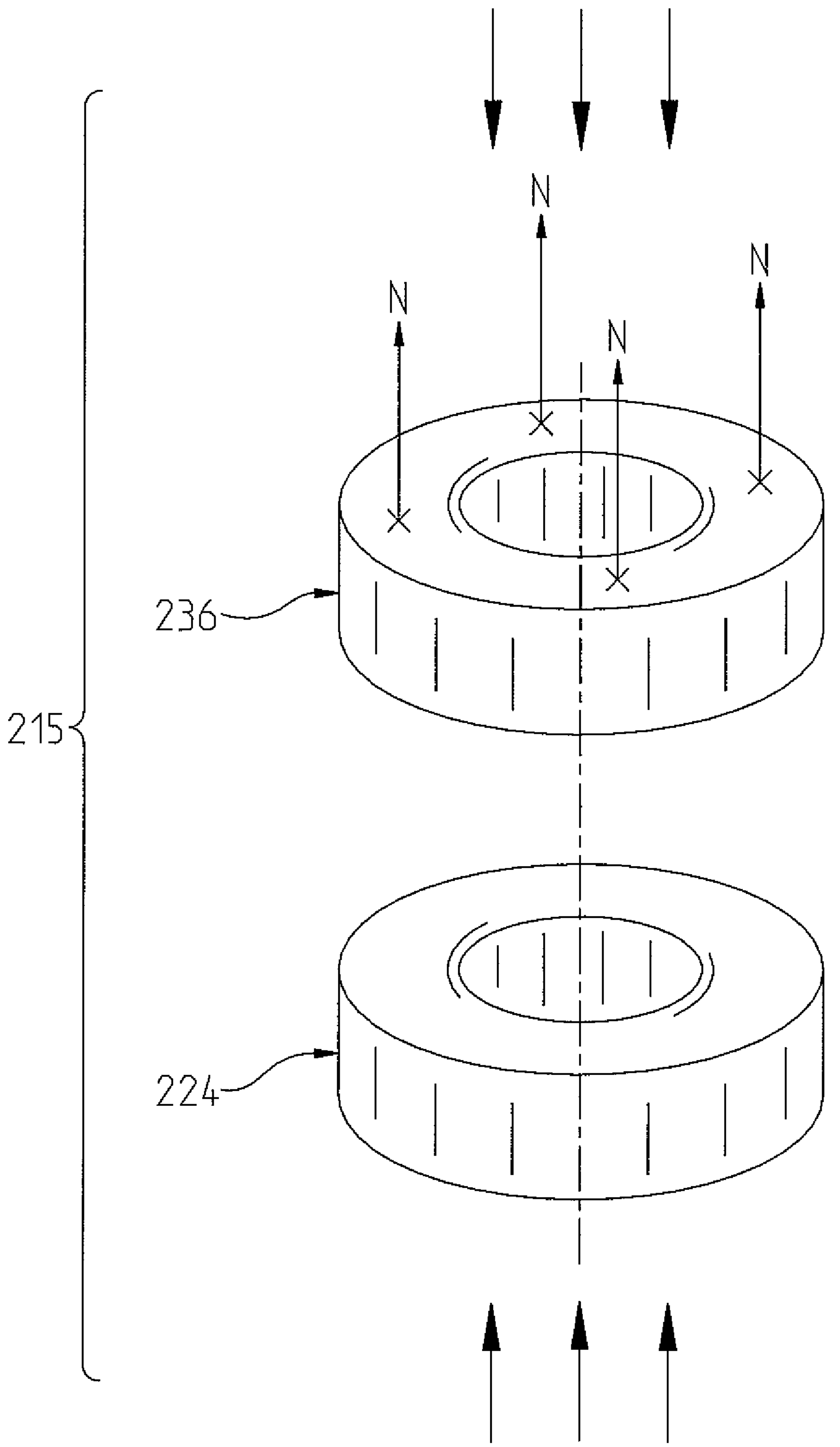
FIG. 10 is a diagrammatic view of another alternative magnetic coupling for use in the faucet of FIG. 4.

The magnetic coupling need not employ two magnets. For instance, as schematically illustrated in FIG. 10, magnetic coupling 215 includes body connector 236, which is a dipolar magnet having single magnetic field N, and head connector 224, which is formed of a magnetically attractable material, such as iron or steel. Head connector 224 and body connector 236 may be coupled to sprayhead 10 and neck 32, respectively, in a manner similar to that of connectors 24, 36 described above. Sprayhead 10 is releasably held to neck 32 of faucet body 14 by the attractive force between magnetic body connector 236 and attractable head connector 224.

Either one of body connector 236 or head connector 224 may be the magnet, and the other may be formed of the magnetically attractable material.

Figure 14:
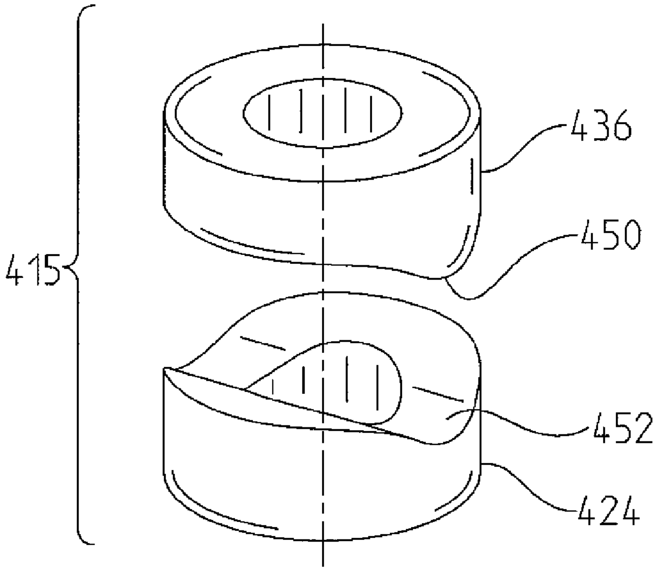
FIGS. 14, 14A and 14B are diagrammatic views of yet another alternative magnetic coupling for use in the faucet of FIG. 4 illustrating various orientations of the head connector and body connector.
Figure 14A:
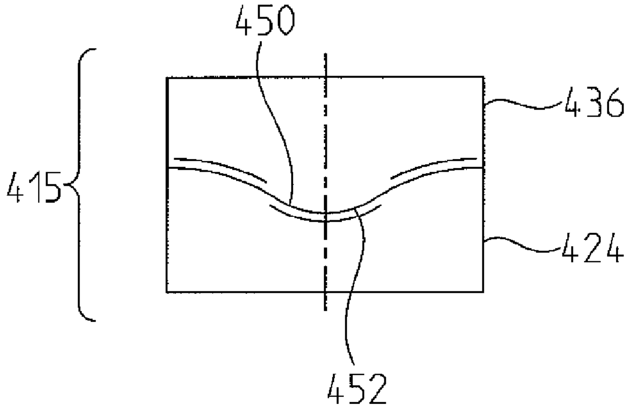
Figure 14B:
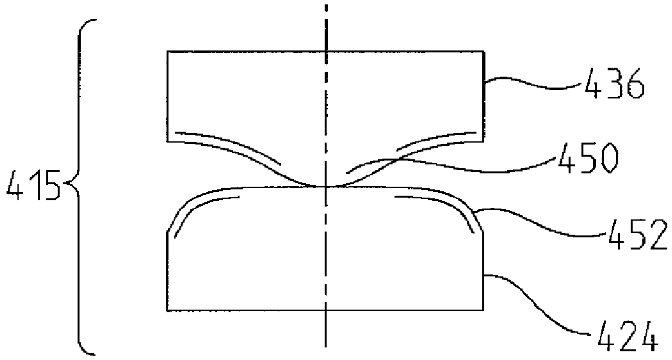

Turning now to FIGS. 14, 14A, and 14B, additional physical or structural features may be employed to guide the user in aligning and coupling the sprayhead 10 to the body 14 and releasing the sprayhead 10 from the body 14. For instance, magnetic coupling 415 includes head connector 424 and body connector 436, which may be respectively coupled to sprayhead 10 and body 14, as described above. Head connector 424 and body connector 436 may be configured like any of the embodiments described above. Body connector 436 includes male component 450 in the form of a curved ridge or protrusion. Head connector 424 includes female component 452 in the form of a curved recess configured to mate with and receive male component 450.

FIGS. 14 and 14A show head connector 424 and body connector 436 in an aligned position such that female component 452 receives male component 450. When in this position, head connector 424 may be brought in closer proximity to body connector 436, thereby maximizing the strength of magnetic attraction.

FIG. 14B shows head connector 424 and body connector 436 in a misaligned position. In this position male member 450 separates body connector 436 from head connector 424 to thereby reduce the magnetic force therebetween and allow the user to more easily pull the sprayhead 10 from the faucet body 14. Male and female members 450 and 452 may have any shape such as rectangular or triangular. However, in this particular embodiment, the curved, sloping shape of female and male members 452 and 450 may also facilitate the user's rotation of head connector 424 relative to body connector 436 to reduce the attractive force between them. In the case where magnetic coupling 415 is a bimodal coupling, such as that in FIGS. 8A and 8B, rotation of head connector 424 relative to body connector 436 generates a repulsive force between them.

Figure 15A:
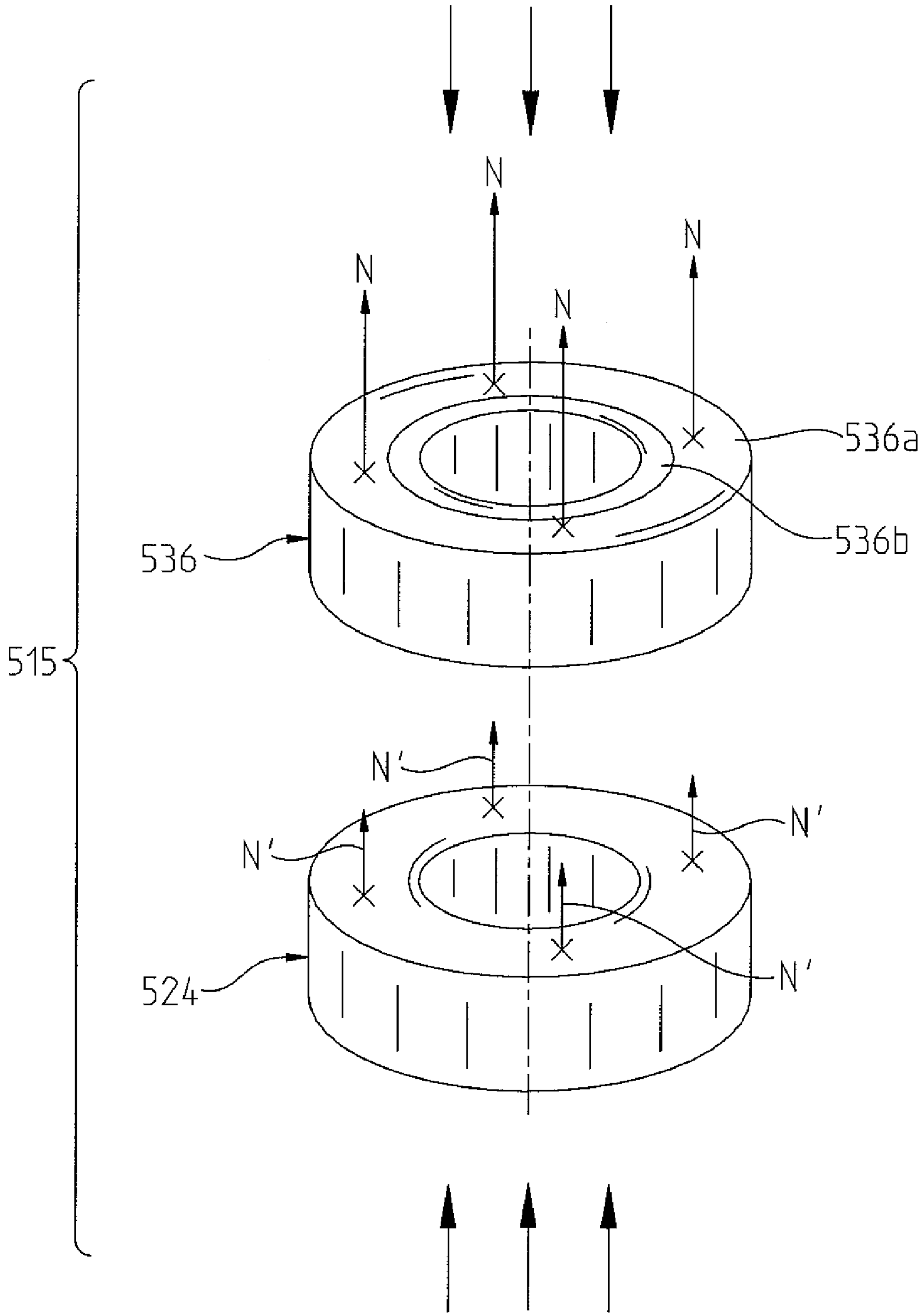
FIG. 15A is a diagrammatic view of yet another magnetic coupling for use in the faucet of FIG. 4, wherein the magnetic coupling is in the attracting mode.
Figure 15B:
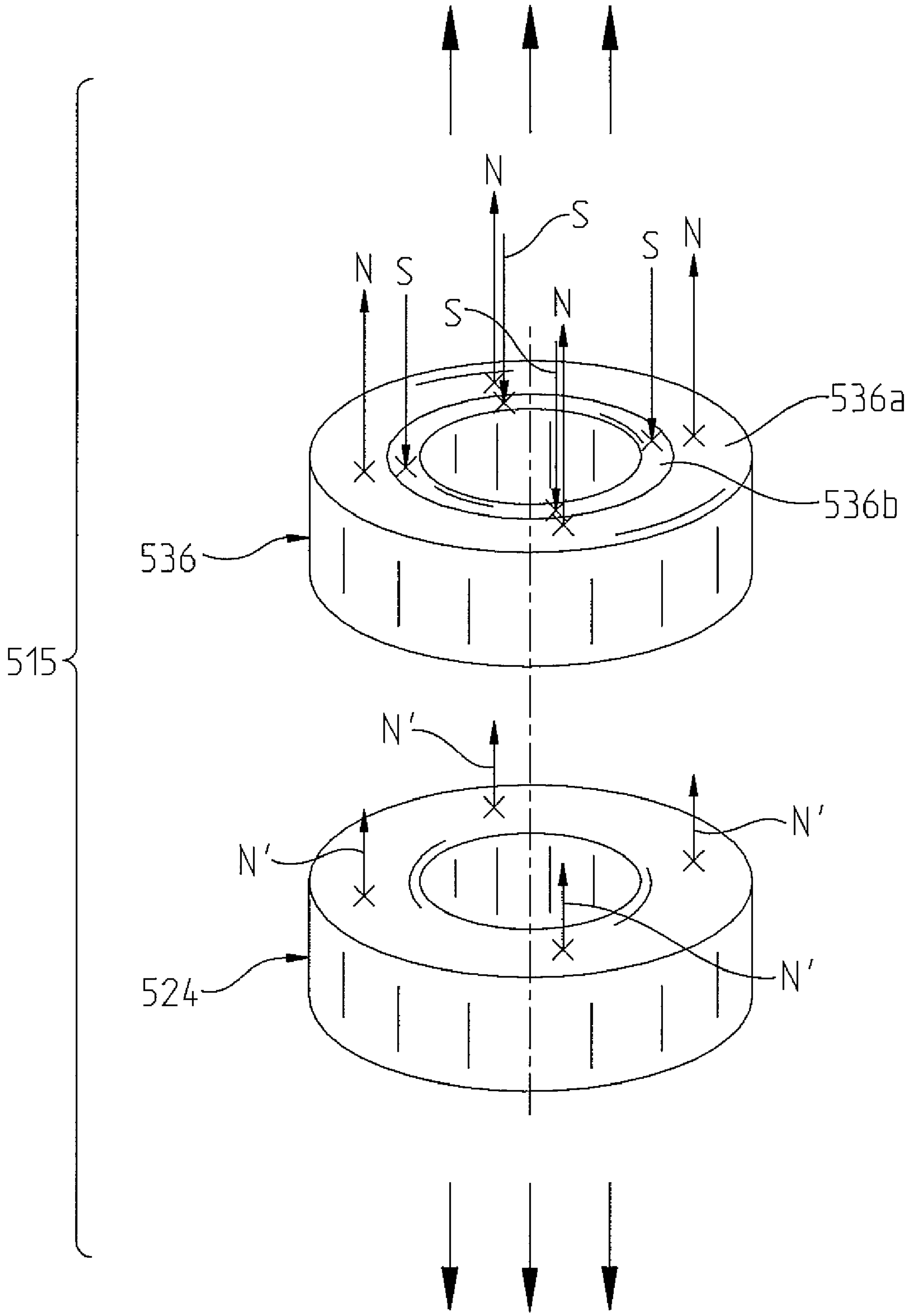
FIG. 15B is a diagrammatic view of the magnetic coupling of FIG. 15A, wherein the magnetic coupling is in the repelling mode.

Any of the above-described embodiments may also include an electromagnet. For instance, either the head connector or the body connector may include an electromagnet switchable between an energized state and a de-energized state. As illustrated in FIGS. 15A and 15B, magnetic coupling 515 includes head connector 524 and body connector 536, which may be respectively coupled to sprayhead 10 and body 14 in the manner described above. Body connector 536 includes a permanent magnetic portion 536*a* having magnetic field N. Head connector 524 is a permanent magnet having magnetic field N', which is oriented in the same direction as magnetic field N. Accordingly, head connector 524 attracts and holds body connector 536 thereto via the attracting forces between magnetic fields N', N, as illustrated by the solid headed arrows in FIG. 15A. Body connector 536 also includes electromagnet portion 536*b*, which is coupled to an energy source, such as a battery, by any known means and is capable of being energized and de-energized by any known means, such as by employing an on/off power switch. Electromagnet portion 536*b*, when energized, is configured to generate magnetic field S, which is oriented in the opposite direction to magnetic field N of permanent magnet portion 536*a* of body connector 536. Therefore, when energized, electromagnet portion 536*b* cancels out the attractive force between magnetic fields N, N' and illustratively repels head connector 524 from body connector 536 to, thereby, ease the release of sprayhead 10 from body 14. When not energized, electromagnet portion 536*b* generates no magnetic field, thereby allowing head connector 524 to be attracted and held to body connector 536. It should be noted that the electromagnet may be disposed on either of body connector 536 or head connector 524, and may be employed in any of the magnetic coupling embodiments described above.

Figure 16:
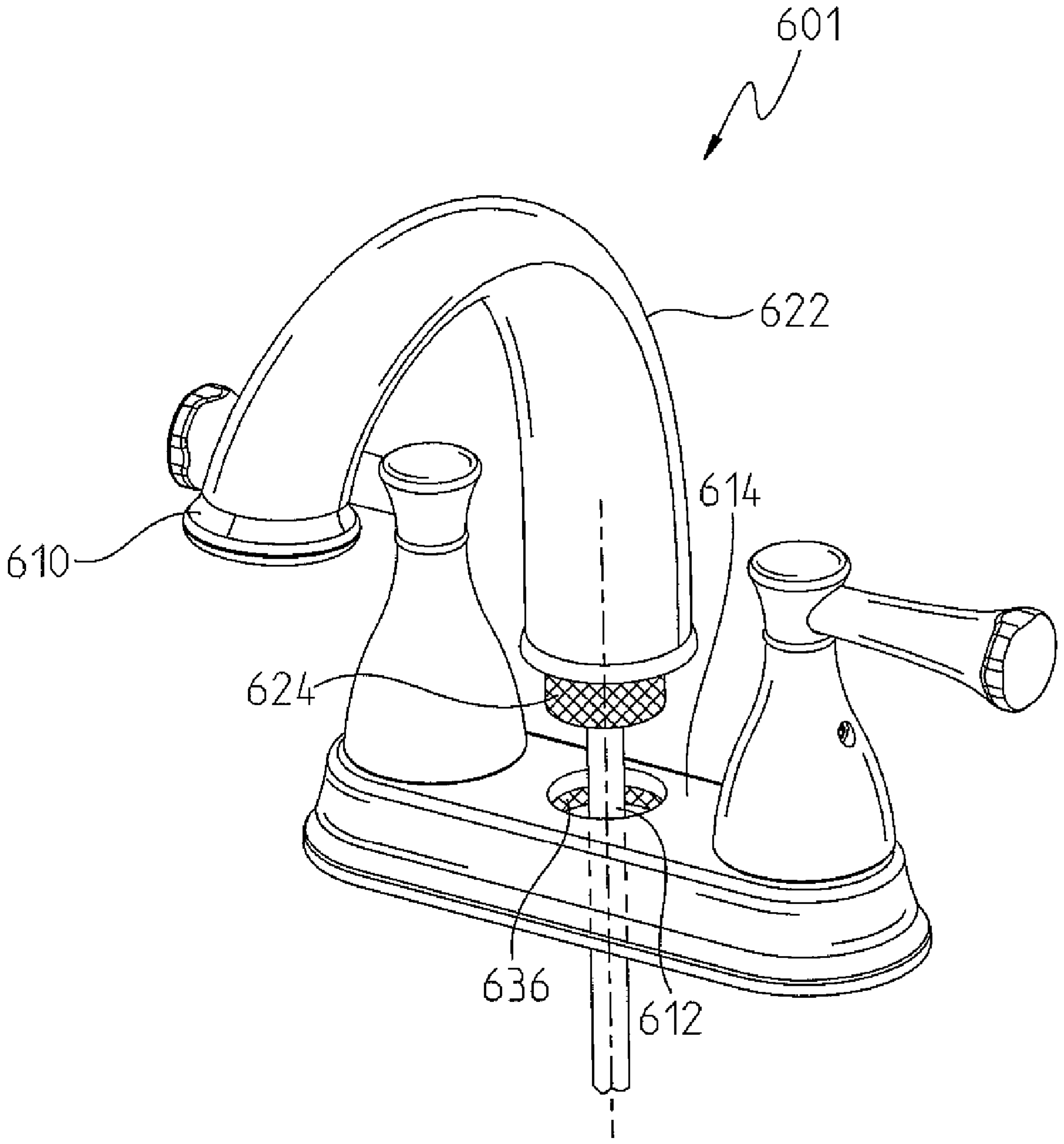
FIG. 16 is a perspective view of a faucet in accordance with another illustrative embodiment of the present invention.

Turning to FIG. 16, faucet 601 is illustrated. Faucet 601 is of a different design than faucet 1 of FIGS. 1-2, but may still employ any of the magnetic coupling embodiments described above. Faucet 601 includes body 614 and sprayhead 610, which is releasably coupled to body 614. Neck or delivery spout 622 is part of sprayhead 610 and, thus, is removable from body 614 along with sprayhead 610. Sprayhead 610 includes head connector 624 and is coupled to water line 612. Body 614 includes body connector 636. Head connector 624 and body connector 636 cooperate with one another to form a magnetic coupling, such as those described above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of coupling and uncoupling a faucet head from a faucet body comprising the steps of:

providing a head;

providing a body;

providing a first connecting element and a first backing element in one of the body and the head, the first connecting element including a magnet, the first backing element positioned on one side of the first connecting element to increase the magnetic field on the other side of the first connecting element to between 400 and 2000 gauss tested at 0.090 inches, and;

providing a magnetically attractive member in the other of the body and the head; and positioning the magnetically attractive member sufficiently near the magnet to generate a magnetic force of between 2 and 12 pounds attracting the head and the body, to thereby couple the head to the body.

2. The method of claim 1, wherein the magnetically attractive member is an electromagnet, the first connector magnet has a magnetic field oriented in a first direction, the electromagnet has an energized state generating an electromagnetic field oriented in a second direction, and the second direction is substantially opposite the first direction to reduce the magnetic force coupling the head and the body.

3. The method of claim 1, wherein the magnetically attractive member includes a second magnet with a second magnetic field, and the magnetic field is oriented in the same direction as the second magnetic field, and wherein the magnet includes a third magnetic field and the second magnet includes a fourth magnetic field, the third magnetic field and the fourth magnetic field oriented substantially opposite the magnetic field and the second magnetic field, further including the step of rotating the head relative to the body to reduce the magnetic force coupling the head and the body.

4. The method of claim 1, wherein the magnetic field ranges between 500 and 1,000 gauss tested at 0.090 inches.

5. The method of claim 1, wherein a gap between the first connecting element and the magnetically attractive member is between 0.040 and 0.100 inches.

6. The method of claim 1, further including the step of rotating the head to repel the head from the body.

7. The method of claim 1, wherein the coupling surface has an area of between 0.5 and 1.0 square inches defined by a first connecting element surface and a magnetically attractive member surface facing the first connecting element surface.

8. The method of claim 7, wherein the magnetic attracting force is between 3 and 8 pounds.

9. The method of claim 7, wherein the magnetic attracting force is between 3.6 and 6 pounds.

10. The method of claim 9, wherein a gap between the first connecting element and the magnetically attractive member is between 0.040 and 0.100 inches.

11. A faucet comprising:

a body;

a supply line adapted to provide a liquid;

a head fluidly connected to the supply line; and a magnetic coupling having a magnetic attracting force for releasably coupling the head and the body, the magnetic coupling including a coupling surface supported by one of the head and the body, a first backing element to increase the magnetic attracting force being positioned on one side of the coupling surface, a first connecting element being positioned between the coupling surface and the first backing element, a first connector being at least partially overmolded over the first connecting element and the first backing element, and a magnetically attractive member being positioned on the other side of the coupling surface, wherein the coupling surface has an area of between 0.4 and 2.0 square inches, and the magnetic attracting force is between 2 and 12 pounds.

12. The faucet of claim 11, wherein the backing element includes a metal selected from the group consisting of iron, steel and stainless steel.

13. The faucet of claim 11, wherein the first connecting element includes a magnetic field oriented in a first direction and a second magnetic field oriented in a second direction, the first direction being substantially opposite the second direction.

14. The faucet of claim 11, wherein the first connecting element includes an electromagnet being switchable between an energized state and a de-energized state, the electromagnet producing an electromagnetic field in the energized state to reduce the attracting force between the head and the body.

15. The faucet of claim 11, wherein the magnetic coupling includes an attracting mode of operation and a repelling mode of operation.

16. The faucet of claim 11, wherein the first connecting element comprises NdFeB.

17. The faucet of claim 11, wherein the first connecting element exhibits a magnetic field of between 400 and 2,000 gauss tested at 0.090 inches on a side opposite the first backing element.

18. The faucet of claim 17, wherein the magnetic field ranges between 500 and 1,000 gauss tested at 0.090 inches.

19. The faucet of claim 17, wherein a gap between the first connecting element and the magnetically attractive member is between 0.040 and 0.100 inches.

20. The faucet of claim 19, wherein the gap equals 0.050 inches.

21. The faucet of claim 20, wherein the coupling surface has an area of between 0.5 and 1.0 square inches defined by a first connecting element surface and a magnetically attractive member surface facing the first connecting element surface.

22. The faucet of claim 21, wherein the magnetic attracting force is between 3 and 8 pounds.

23. The faucet of claim 21, wherein the magnetic attracting force is between 3.6 and 6 pounds.

24. The faucet of claim 21, wherein a gap between the first connecting element and the magnetically attractive member is between 0.040 and 0.100 inches.

25. The faucet of claim 11, wherein the first connector is configured to secure the first connecting element to one of the head and the body of the faucet.

26. The faucet of claim 25, wherein the first connector encapsulates the first connecting element and the first backing element to prevent corrosion thereof.

27. The faucet of claim 11, wherein the first connecting element includes a magnet.

28. The faucet of claim 27, wherein the magnet is a dipolar magnet.

29. The faucet of claim 27, wherein the magnet is a multipolar magnet.

30. The faucet of claim 27, wherein the first connecting element comprises more than one magnet.

31. The faucet of claim 11, wherein the magnetically attractive member comprises a second connecting element.

32. The faucet of claim 31, wherein the second connecting element includes a second magnet.

33. The faucet of claim 31, further including a second backing element, the second connecting element being positioned between the coupling surface and the second backing element.

34. The faucet of claim 33, wherein the second connecting element is substantially identical to the first connecting element and the second backing element is substantially identical to the first backing element.

35. A faucet comprising:

a body;

a supply line adapted to provide a liquid;

a head fluidly connected to the supply line; and a magnetic coupling having a magnetic attracting force for releasably coupling the head and the body, the magnetic coupling including a coupling surface having an area of between 0.4 and 2.0 square inches, a magnetically attractive member positioned on one side of the coupling surface, a first connector coupled to one of the head and the body and positioned on the other side of the coupling surface, and a first connecting element having a magnetic field of between 400 and 2000 gauss to generate an attraction force between the first connecting element and the magnetically attractive member of between 2 and 12 pounds, the first connector being at least partially overmolded over the first connecting element to couple the first connecting element to one of the head and the body.

36. The faucet of claim 35, wherein the first connector encapsulates the first connecting element to prevent corrosion thereof.

37. The faucet of claim 35, wherein the first connecting element includes a magnet.

38. The faucet of claim 35, wherein the magnetically attractive member is a second connecting element.

39. The faucet of claim 38, wherein the second connecting element includes a second magnet.

40. The faucet of claim 38, further including a second connector being at least partially overmolded over the second connecting element to couple the second connecting element to the other of the head and the body of the faucet.

41. A liquid dispensing assembly comprising:

a supply hose adapted to supply a liquid;

a liquid dispenser fluidly coupled to the supply hose and adapted to dispense the liquid;

a support member adapted to support the liquid dispenser;

a magnetic member at least partially overmolded with a polymer, the polymer being formed into a connector adapted to couple the magnetic member to one of the liquid dispenser and the support member; and a member magnetically attracted to the magnetic member and supported by the other of the liquid dispenser and the support member, the magnetic member and the member forming a magnetic coupling having a coupling surface area of between 0.4 and 2.0 square inches defined by a magnetic member surface and a member surface facing the magnetic member surface, the magnetic coupling requiring between 2.0 and 12.0 pounds of force to pull the liquid dispenser from the support member.

42. The liquid dispensing assembly of claim 41, wherein the polymer comprises one of acetal and glass filled polypropylene.

43. The liquid dispensing assembly of claim 41, wherein the magnetic member comprises NdFeB.

44. The liquid dispensing assembly of claim 43, wherein the magnetic member has a magnetic field of between 400 and 2,000 gauss.

45. The liquid dispensing assembly of claim 41, further comprising a backing element positioned adjacent to a backing side of the magnetic member such that the magnetic member is between the backing element and the member, the backing element configured to strengthen the magnetic strength of the magnetic coupling.

46. The liquid dispensing assembly of claim 45, wherein the coupling surface area ranges between 0.5 and 1.0 square inches, the magnetic attracting force is between 3 and 8 pounds, and the magnetic field on a side of the magnetic member opposite the backing side ranges between 500 and 1,000 gauss.

47. The liquid dispensing assembly of claim 45, wherein the backing element is at least partially overmolded by the polymer.

48. The liquid dispensing assembly of claim 47, wherein the magnetic member comprises NdFeB.

49. The liquid dispensing assembly of claim 41, wherein magnetic coupling has a first position adapted to attract the liquid dispenser to the support member and a second position adapted to repel the liquid dispenser from the support member.

50. The liquid dispensing assembly of claim 41, wherein magnetic member comprises a magnetic field oriented in a first direction and a second magnetic field oriented in a second direction, the first direction being substantially opposite the second direction.

51. The liquid dispensing assembly of claim 41, wherein magnetic member comprises two or more magnets.

52. The liquid dispensing assembly of claim 41, wherein magnetic member comprises a multipolar magnet.

* * * * *

UNITED STATES PATENT AND TRADEMARK OFFICE
Certificate

Patent No. 7,753,079 B2

Patented: July 13, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Alfred Charles Nelson, Carmel, IN (US); and Christopher Michael McGuire, Fishers, IN (US).

Signed and Sealed this Twentieth Day of March 2012.

STEPHEN M. HEPPERLE
*Supervisory Patent Examiner*
Art Unit 3753
Technology Center 3700